(12) United States Patent
O'Daniel

(10) Patent No.: US 9,794,017 B2
(45) Date of Patent: Oct. 17, 2017

(54) SWDM OSAS

(71) Applicant: Finisar Corporation, Sunnyvale, CA (US)

(72) Inventor: Jason O'Daniel, Richardson, TX (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 14/825,138

(22) Filed: Aug. 12, 2015

(65) Prior Publication Data

US 2017/0048015 A1   Feb. 16, 2017

(51) Int. Cl.
| | |
|---|---|
| H04J 14/02 | (2006.01) |
| H04B 10/50 | (2013.01) |
| G02B 6/42 | (2006.01) |
| H04B 10/40 | (2013.01) |

(52) U.S. Cl.
CPC ........... H04J 14/02 (2013.01); G02B 6/4219 (2013.01); G02B 6/4246 (2013.01); H04B 10/40 (2013.01); H04B 10/503 (2013.01); H04B 10/506 (2013.01)

(58) Field of Classification Search
CPC .................................................. H04B 10/506
See application file for complete search history.

(56) References Cited

U.S. PATENT DOCUMENTS

| | | | |
|---|---|---|---|
| 6,941,047 B2 * | 9/2005 | Capewell | G02B 6/29367 385/33 |
| 7,668,422 B2 * | 2/2010 | Kropp | G02B 6/29367 359/577 |
| 2007/0058976 A1 | 3/2007 | Tatum et al. | |
| 2011/0058771 A1 * | 3/2011 | Lee | G02B 6/4215 385/33 |
| 2012/0189306 A1 * | 7/2012 | Du | G02B 6/4215 398/65 |
| 2012/0189314 A1 | 7/2012 | Xu et al. | |
| 2012/0189323 A1 * | 7/2012 | Xu | H04B 10/506 398/201 |
| 2013/0148970 A1 | 6/2013 | Nakajima et al. | |

(Continued)

OTHER PUBLICATIONS

International Search Report and Written Opinion dated Oct. 21, 2016 in related PCT Application No. PCT/US2016/046890 (14 pages).

(Continued)

*Primary Examiner* — Nathan Curs
(74) *Attorney, Agent, or Firm* — Maschoff Brennan

(57) ABSTRACT

In an example embodiment, an N-channel WDM OSA includes active optical devices coupled to a carrier, an optical block, and a MUX or a DEMUX. The optical block may be positioned above the active optical devices and coupled to the carrier. The optical block may include a bottom with lenses formed in the bottom that are aligned with the active optical devices; a first side that extends up from the bottom; a second side that extends up from the bottom and is opposite the first side; a port that extends forward from the bottom and the first and second sides; and an optical block cavity defined by the bottom and the first and second sides that extends rearward from the port. The MUX or DEMUX may be positioned in the optical block cavity in an optical path between the port of the optical block and the active optical devices.

21 Claims, 11 Drawing Sheets

(56) References Cited

U.S. PATENT DOCUMENTS

2015/0304053 A1* 10/2015 Pfnuer .................. G02B 6/428
                                                    398/212
2016/0252690 A1*  9/2016 Kawamura .......... G02B 6/4246
2016/0308622 A1* 10/2016 Pfnuer ................ H04B 10/676

OTHER PUBLICATIONS

G. E. Tangdiongga et al., "Optical design of 4-channel TOSA/ROSA for CWDM applications", Proc. SPIE 6899, Photonics Packaging, Integration, and Interconnects VIII, 689901 (Feb. 8, 2008); doi:10.1117/12.64238.

C. W. Tan et al., "Development of Optical MUX/DEMUX on Silicon Optical Bench—Assembly Accuracies," in IEEE Transactions on Advanced Packaging, vol. 32, No. 3, pp. 650-656, Aug. 2009. doi: 10.1109/TADVP.2009.2024693.

T. Ohyama et al., "Compact hybrid-integrated 100-Gbit/s TOSA for 40-km transmission," 2015 Opto-Electronics and Communications Conference (OECC), Shanghai, 2015, pp. 1-3. doi: 10.1109/OECC.2015.7340077.

* cited by examiner

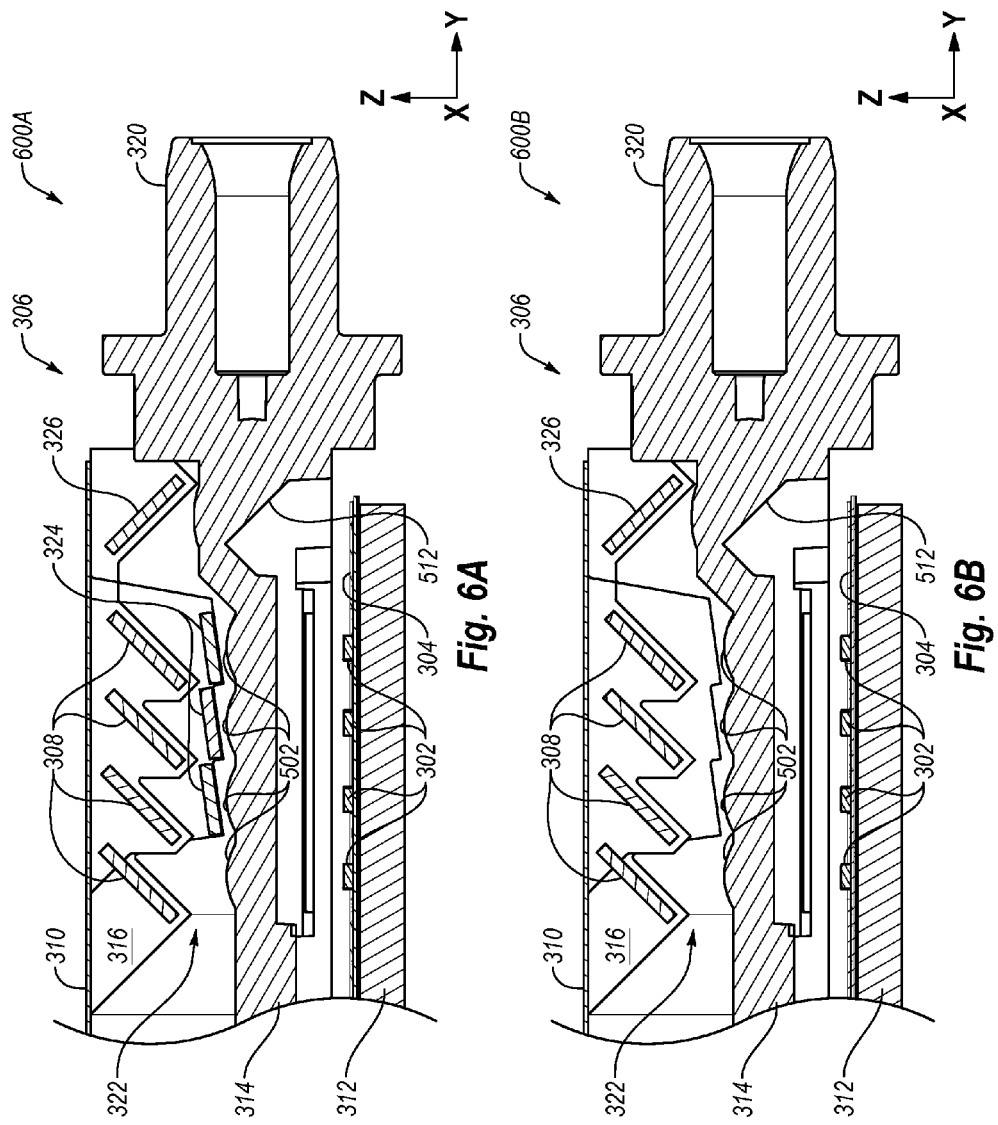

SWDM OSAS

FIELD

Example embodiments described herein relate to short wave coarse wavelength division multiplexing (SWDM) optical subassemblies (OSAs) and other multi-channel OSAs.

BACKGROUND

Unless otherwise indicated, the materials described in the background section are not prior art to the claims in the present application and are not admitted to be prior art by inclusion in this section.

In the field of data transmission, one method of efficiently transporting data is through the use of fiber optics. Digital data is propagated through a fiber optic cable using light emitting diodes or lasers. Light signals allow for extremely high transmission rates and very high bandwidth capabilities. Light signals are also resistant to electromagnetic interference that would otherwise interfere with electrical signals. Light signals are more secure because they do not allow portions of the signal to escape from the fiber optic cable as can occur with electrical signals in wire-based systems. Light also can be conducted over greater distances without the signal loss typically associated with electrical signals on copper wire.

It is often desirable in the networking context to maximize the amount of data that can be propagated through the network. It is also desirable for economic reasons to minimize the hardware used to create the network infrastructure. To accomplish both of these objectives, multiplexing schemes are used to transmit multiple signals along a single physical path such as an optical fiber. One method of multiplexing is wavelength division multiplexing (WDM). In fiber-optic systems, WDM includes transmitting various individual signals along a single fiber, with each signal being used to transmit a different light wavelength or channel.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF SOME EXAMPLE EMBODIMENTS

Example embodiments described herein relate to SWDM OSAs and other multi-channel OSAs.

In an example embodiment, an N-channel WDM OSA includes multiple active optical devices coupled to a carrier, an optical block, and a wavelength division multiplexer (MUX) or a wavelength division demultiplexer (DEMUX). The optical block is positioned above the active optical devices and is coupled to the carrier. The optical block may include: a bottom with lenses formed in the bottom that are aligned with the active optical devices; a first side that extends up from the bottom; a second side that extends up from the bottom and is opposite the first side; a port that extends forward from the bottom and the first and second sides; and an optical block cavity defined by the bottom and the first and second sides that extends rearward from the port. The MUX or DEMUX may be positioned in the optical block cavity in an optical path between the port of the optical block and the active optical devices In another example embodiment, an optoelectronic module includes a housing and an N-channel WDM OSA. The housing defines a cavity, where dimensions of the housing are compliant with a quad small form factor pluggable (QSFP) multisource agreement (MSA). The N-channel WDM OSA is positioned within the cavity, where N is at least two. The N-channel WDM OSA may include the N-channel WDM OSA described in the previously example embodiment, or variations thereof as described herein.

In another example embodiment, a method to assemble an N-channel WDM OSA that includes an optical block, a carrier, N−1 thin film filters, and a mirror may include aligning the optical block to the carrier such that each of N lenses formed in a bottom of the optical block is positioned above and is aligned to a corresponding one of N active optical devices coupled to the carrier. The method may also include securing the optical block to the carrier with the optical block aligned to the carrier. The method may also include individually aligning each of the N−1 thin film filters and the mirror to the optical block to form with the N lenses an optical path that directs light between the N active optical devices and a port of the optical block that extends forward from the bottom and first and second sides of the optical block. The bottom and the first and second sides of the optical block may define an optical block cavity that extends rearward from the port. The N−1 thin film filters and the mirror may be aligned to the optical block within the optical block cavity. The method may also include securing each of the N−1 thin film filters and the mirror to the optical block with the N−1 thin film filters and the mirror aligned to the optical block.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIGS. 6A and 6B include cross-sectional side views of a receiver optical subassembly (ROSA) and a transmitter optical subassembly (TOSA) that represent implementations of the N-channel WDM OSA of FIGS. 3A and 3B;

DETAILED DESCRIPTION OF SOME EXAMPLE EMBODIMENTS

To accomplish WDM, several specialized optical components are needed, including DEMUXes and MUXes. MUX/DEMUX components are often relatively bulky and/or expensive. As such, it has heretofore been technically and/or economically infeasible to incorporate a MUX and/or a DEMUX into relatively compact and low-cost optoelectronic devices, such as short wave (SW) small-form factor pluggable optoelectronic devices, including SW QSFP-compliant optoelectronic devices.

Some embodiments described herein include low-cost OSAs small enough to fit in SW QSFP-compliant or other relatively small optoelectronic devices and that incorporate a MUX or a DEMUX. The OSAs described herein may alternately or additionally by used in relatively larger optoelectronic devices.

In an example embodiment, the MUX or the DEMUX may include multiple thin film filters aligned at about a 45 degree angle to incoming light, which may be difficult for many vendors to fabricate at all or in an economic manner. Embodiments described herein additionally include methods to economically fabricate such OSAs without sacrificing performance.

A common method for coarse WDM (CWDM) alignment of long-wave single mode OSAs relies on individual adjustment of discrete lenses associated with each channel to align to an optical filter of a MUX or DEMUX. Due to cost-restraints in SW multimode OSAs, embodiments described herein use elements (e.g., such as filters or mirrors) of the MUX or DEMUX themselves as a compensation mechanism for die placement errors and/or lens fabrication errors. In some embodiments, one alignment phase of the fabrication method described herein actively aligns an optical block of the OSA to a carrier of the OSA that includes multiple active optical devices (e.g., optical transmitters or receivers) of the OSA. The active alignment in this alignment phase of the fabrication method may optimize z placement of each individual lens included in the optical block of the OSA for height variations from the active optical devices. In another alignment phase of the fabrication method, the elements of the MUX or DEMUX may be individually aligned to the optical block to individually optimize each channel independent from the other channels to compensate for manufacturing error and variation.

Reference will now be made to the drawings to describe various aspects of some example embodiments of the invention. The drawings are diagrammatic and schematic representations of such example embodiments, and are not limiting of the present invention, nor are they necessarily drawn to scale.

I. Example Operating Environment

Figure 1:
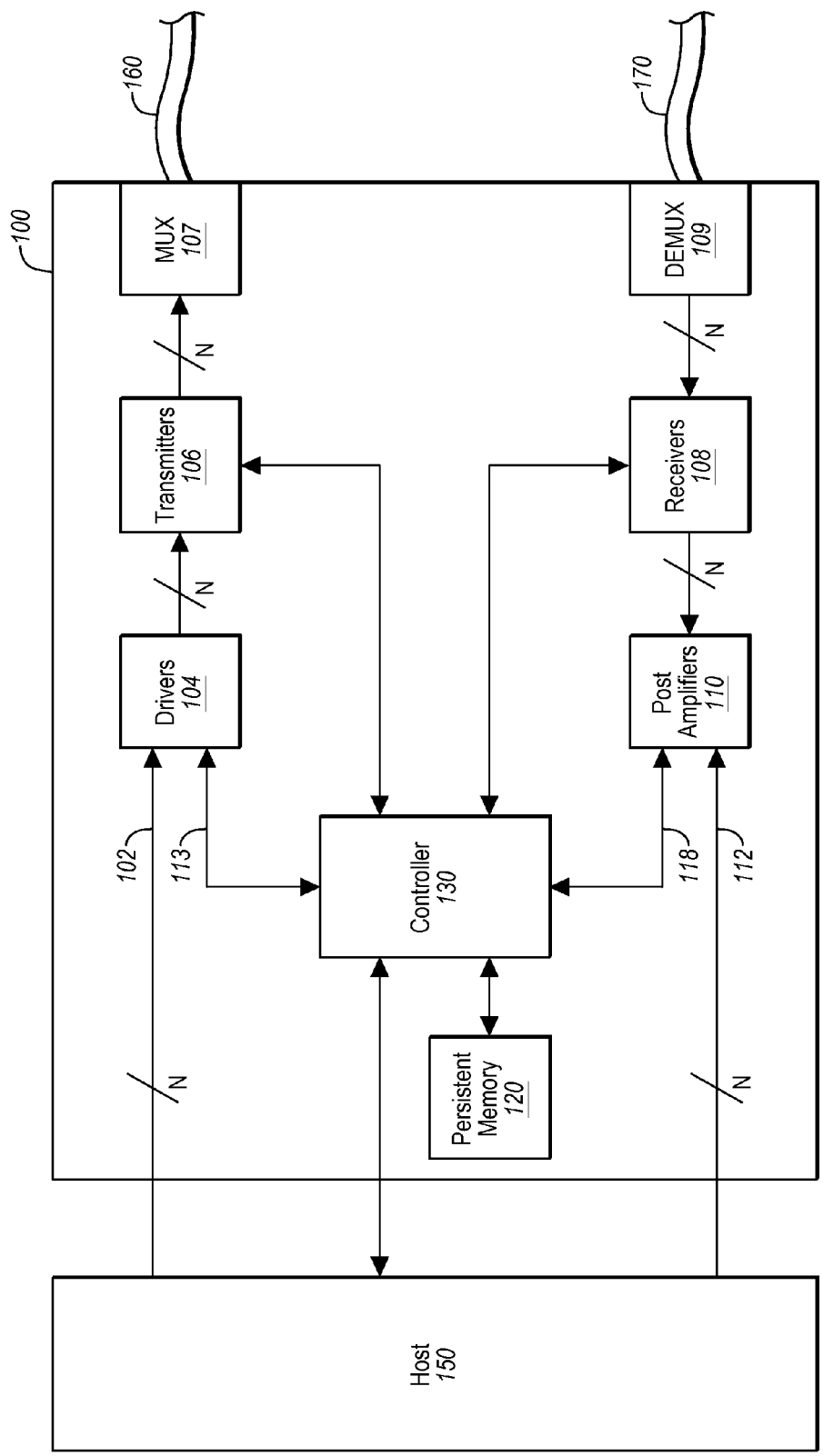
FIG. 1 illustrates an example multi-channel optoelectronic device in which some embodiments described herein may be implemented.

FIG. 1 illustrates an example multi-channel optoelectronic device 100 (hereinafter "device 100") in which some embodiments described herein may be implemented, arranged in accordance with at least one embodiment described herein. The device 100 may include, for instance, a multi-channel transponder or transceiver that may conform to the quad small form factor pluggable (QSFP) multi-source agreement (MSA), the 100 gigabit per second (Gb/s) form-factor pluggable (CFP) MSA, or other form-factor MSA or non-MSA form-factor. FIG. 1 further depicts the interaction between the device 100, a host 150 and optical fibers 160, 170. The device 100 may transmit N data channels and receive N data channels over optical fibers 160, 170, respectively. While the device 100 and related components (e.g., host, fiber optic cables, etc.) will be described in some detail, they are described by way of illustration only, and not by way of restricting the scope of the described embodiments.

During operation, the device 100 can receive N electrical signals 102 from the host 150, which can be any computing system capable of communication with the device 100, for transmission as N optical signals on to the optical fiber 160. Each of the N electrical signals 102 is provided to one of N laser drivers 104. The N drivers 104 provide N modulation signals to N optical transmitters 106, driving the N optical transmitters 106 to emit N optical signals that include the information carried by the N electrical signals 102. The N optical signals are received by a wavelength division multiplexer (MUX) 107 and multiplexed together, e.g., spatially combined, onto the optical fiber 160.

Each of the N optical transmitters 106 includes an active optical device implemented as a light source having any suitable configuration. For example, each of the N optical transmitters 106 may include a distributed feedback (DFB) laser, a vertical cavity surface emitting laser (VCSEL), a Fabry-Perot laser, an LED, or other suitable optical transmitter. In an example embodiment, the N optical transmitters 106 include four VCSELs, although other arrangements, light sources and materials may alternately or additionally be used.

The device 100 may also be configured to receive N optical signals spatially combined in the optical fiber 170 at a wavelength division demultiplexer (DEMUX) 109. The DEMUX 109 demultiplexes, e.g., spatially separates, the N optical signals from each other and provides the demultiplexed N optical signals to N optical receivers 108. Each of the N optical receivers 108 may include an active optical device such as a photodetector, a photodiode, an avalanche photodiode (APD), a positive-intrinsic-negative photodiode (PIN), or other suitable optical receiver. In an example embodiment, the N optical receivers 108 include four photodiodes, although other arrangements, receivers and materials may alternately or additionally be used.

The N optical receivers 108 transform the received N optical signals into N electrical signals. N post-amplifiers 110 amplify the N electrical signals received from the N optical receivers 108 and provide N amplified signals 112 to the host 150. In other words, the device 100 can receive N optical signals, transform every one into an electrical signal, amplify each signal, and provide N amplified electrical signals representative of the N received optical signals to the host 150.

The device 100 illustrated in FIG. 1 may implement the same number (e.g., N) of drivers, transmitters, receivers and post-amplifiers as there are channels. Alternatively or additionally, the device 100 may receive M electrical signals 102 from the host 150 that are converted to N optical signals output to the optical fiber 160 and may receive N optical signals from the optical fiber 170 that are converted to M amplified electrical signals 112 that are provided to the host 150, where M and N are different.

The behavior of the N drivers 104, the N optical transmitters 106, the N optical receivers 108, and the N post amplifiers 110 may vary dynamically due to a number of factors. For example, temperature changes, power fluctuations, feedback conditions, and aging effects may each affect the performance of these components. Accordingly, the optoelectronic device 100 may further include a controller 130, which can evaluate conditions pertinent to optoelectronic device operation, such as temperature, voltage or bias current, and receive information from the N drivers 104, the N optical transmitters 106, the N optical receivers 108, and the N post amplifiers 110, as represented by arrows 113, 114, 116 and 118, respectively. This allows the controller 130 to optimize the dynamically varying performance, and additionally detect when there is a loss of signal. Specifically, the controller 130 may optimize the operation of the device 100 by adjusting settings on each of the N drivers 104 and/or the N post amplifiers 110 individually. These settings adjustments can be intermittent and may generally be made when temperature or voltage or other low frequency changes so warrant.

The controller 130 may have access to a persistent memory 120, which may include an electrically erasable programmable read-only memory (EEPROM). Persistent memory 120 may alternatively or additionally include any other nonvolatile memory source. The persistent memory 120 and the controller 130 may be packaged together in the same package or in different packages without restriction. Data may be exchanged between the controller 130 and the host 150 using an appropriate interface 122, such as I2C, MDIO, SPI, or other suitable interface.

Figure 2:
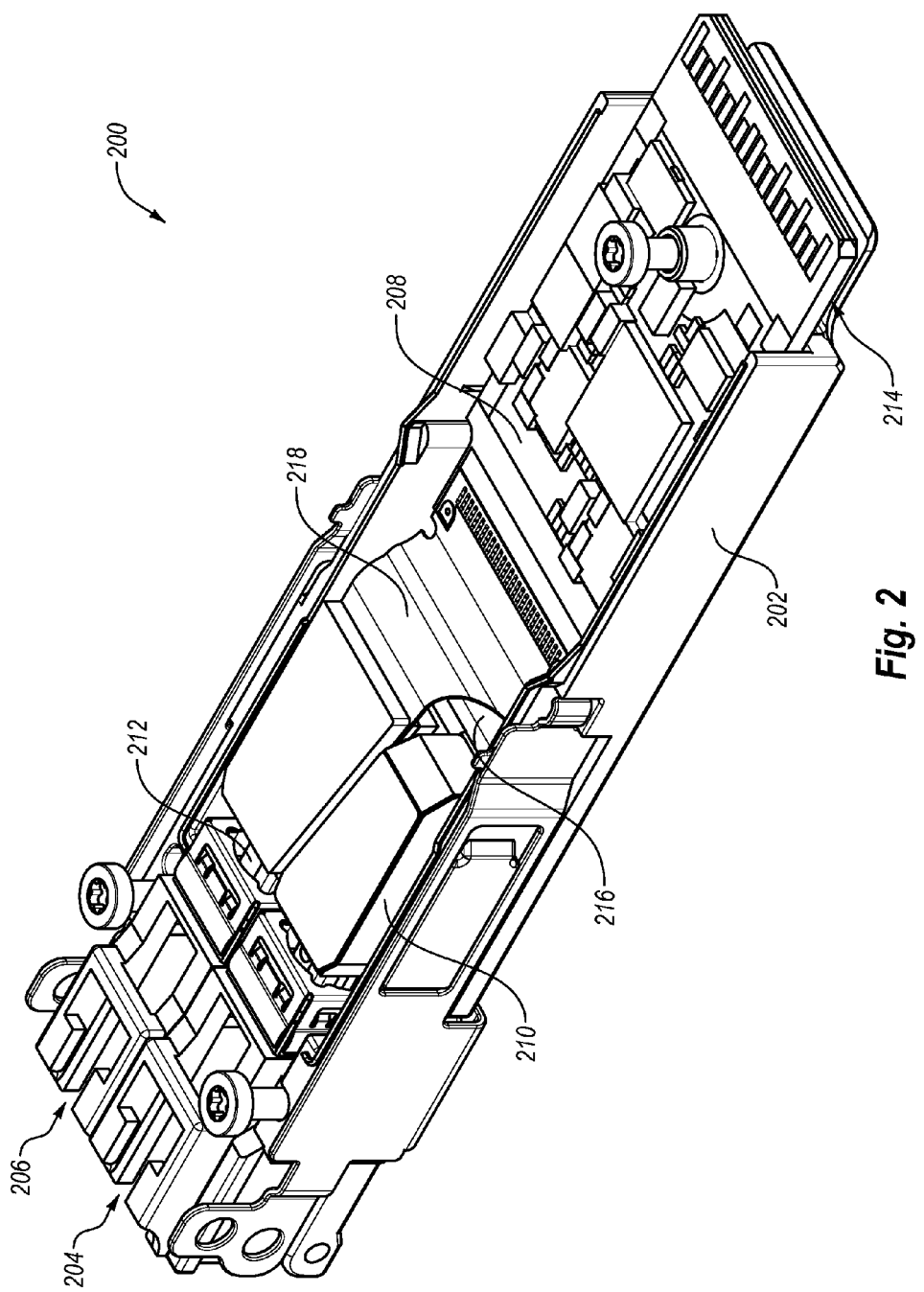
FIG. 2 is a perspective view of another example multi-channel optoelectronic device.

FIG. 2 is a perspective view of another example multi-channel optoelectronic device 200 (hereinafter "device 200"), arranged in accordance with at least one embodiment described herein. The device 200 may include or correspond to the device 100 of FIG. 1.

As illustrated, the device 200 may include a bottom housing 202; a receive fiber connector port 204 and a transmit fiber connector port 206; a printed circuit board assembly (PCBA) 208 with one or more circuit elements positioned within the bottom housing 202; and a receiver optical subassembly (ROSA) 210 and a transmitter optical subassembly (TOSA) 212 also positioned within the bottom housing 202. An edge connector 214 may be located on an end of the PCBA 208 to enable the device 200 to electrically interface with a host, such as the host 150 of FIG. 1. As such, the PCB 208 facilitates electrical communication between the host and the ROSA 210 and between the host and the TOSA 212.

The ROSA 210 may include or correspond to one or more of the DEMUX 109, the N optical receivers 108, and the N post amplifiers 110 of FIG. 1. The TOSA 212 may include or correspond to one or more of the N drivers 104, the N optical transmitters 106, and the MUX 107 of FIG. 1.

The device 200 may be configured for optical signal transmission and reception at a variety of data rates including, but not limited to, 1 Gb/s, 10 Gb/s, 20 Gb/s, 40 Gb/s, 100 Gb/s, or higher. Furthermore, the device 200 may be configured for optical signal transmission and reception at various distinct wavelengths using one of various wavelength division multiplexing (WDM) schemes, such as Coarse WDM, Dense WDM, or Light WDM. Furthermore, the device 200 may be configured to support various communication protocols including, but not limited to, Fibre Channel and High Speed Ethernet. In addition, the device 200 is illustrated in FIG. 2 as being compliant with or conforming to the QSFP MSA. More generally, the device 200 may be configured for compliance with any of a variety of form factors including, but not limited to, the Small Form-factor Pluggable (SFP), the enhanced Small Form-factor Pluggable (SFP+), the 10 Gigabit Small Form Factor Pluggable (XFP), the C Form-factor Pluggable (CFP) and the Quad Small Form-factor Pluggable (QSFP) multi-source agreements (MSAs).

The bottom housing 202 defines a cavity within which the ROSA 210 and the TOSA 212 are disposed. A top housing (not shown) of the device 200 may cooperate with the bottom housing 202 to enclose the ROSA 210 and the TOSA 212 within the cavity. A housing of the device 200 (including the bottom housing 202 and/or the top housing) may have dimensions that are compliant with the QSFP MSA or other suitable MSA.

The ROSA 210 may house N optical receivers, such as photodiodes, that are electrically coupled to an electrical interface 216. The N optical receivers may be configured to convert optical signals received through the receive fiber connector port 204 into corresponding electrical signals that are relayed to a host through the electrical interface 216 and the PCBA 208. The TOSA 212 may house N optical transmitters, such as lasers, that are electrically coupled to another electrical interface 218. The N optical transmitters may be configured to convert electrical signals received from the host device by way of the PCBA 208 and the electrical interface 218 into corresponding optical signals.

The device 200 illustrated in FIG. 2 is one architecture in which embodiments of the present disclosure may be employed. This specific architecture is only one of countless architectures in which embodiments may be employed. The scope of the present disclosure is not limited to any particular architecture or environment.

II. WDM OSA

Figure 3A:
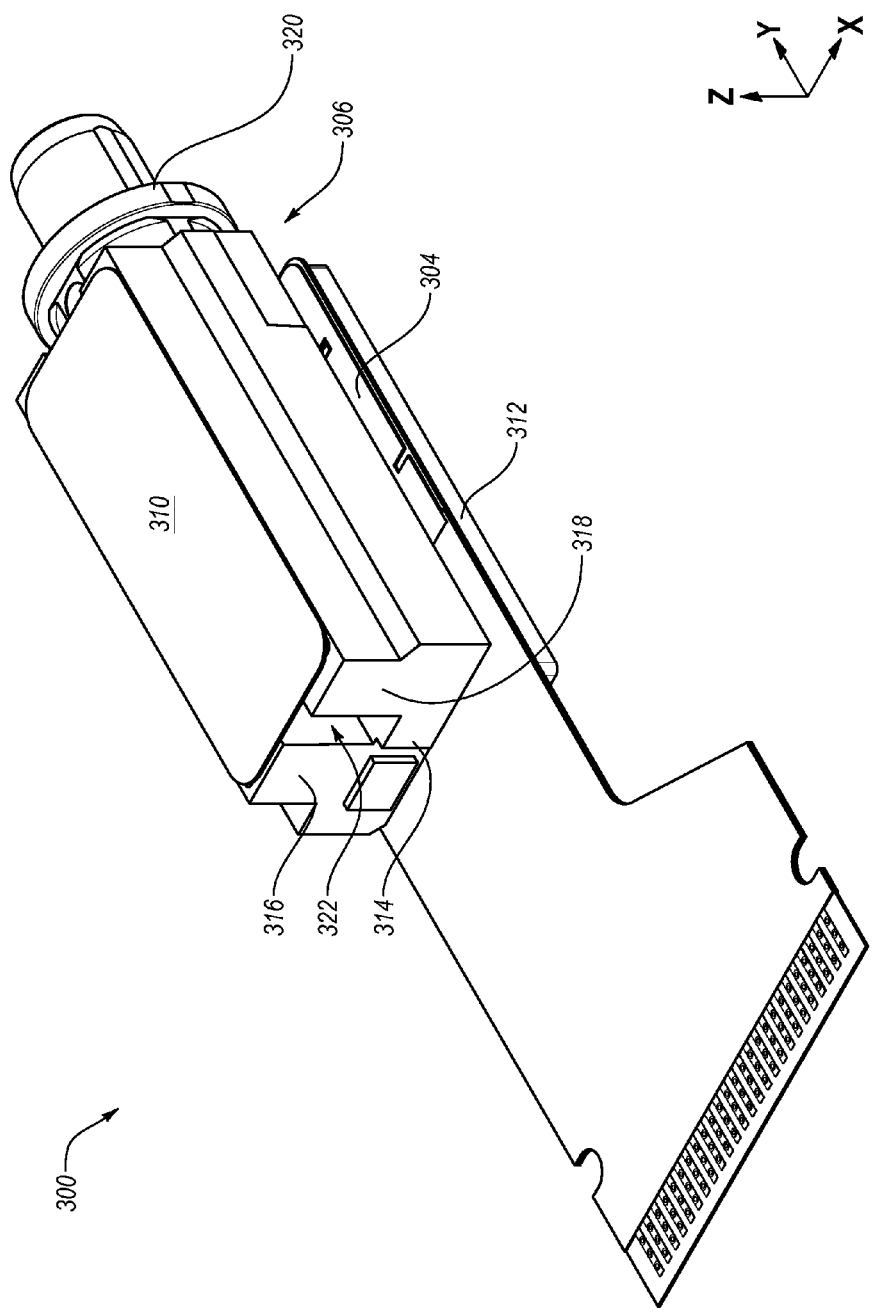
FIGS. 3A and 3B include a perspective view and a partially exploded perspective view of an example N-channel WDM optical subassembly (OSA) that may be implemented in the multi-channel optoelectronic device of FIG. 1 or 2.
Figure 3B:
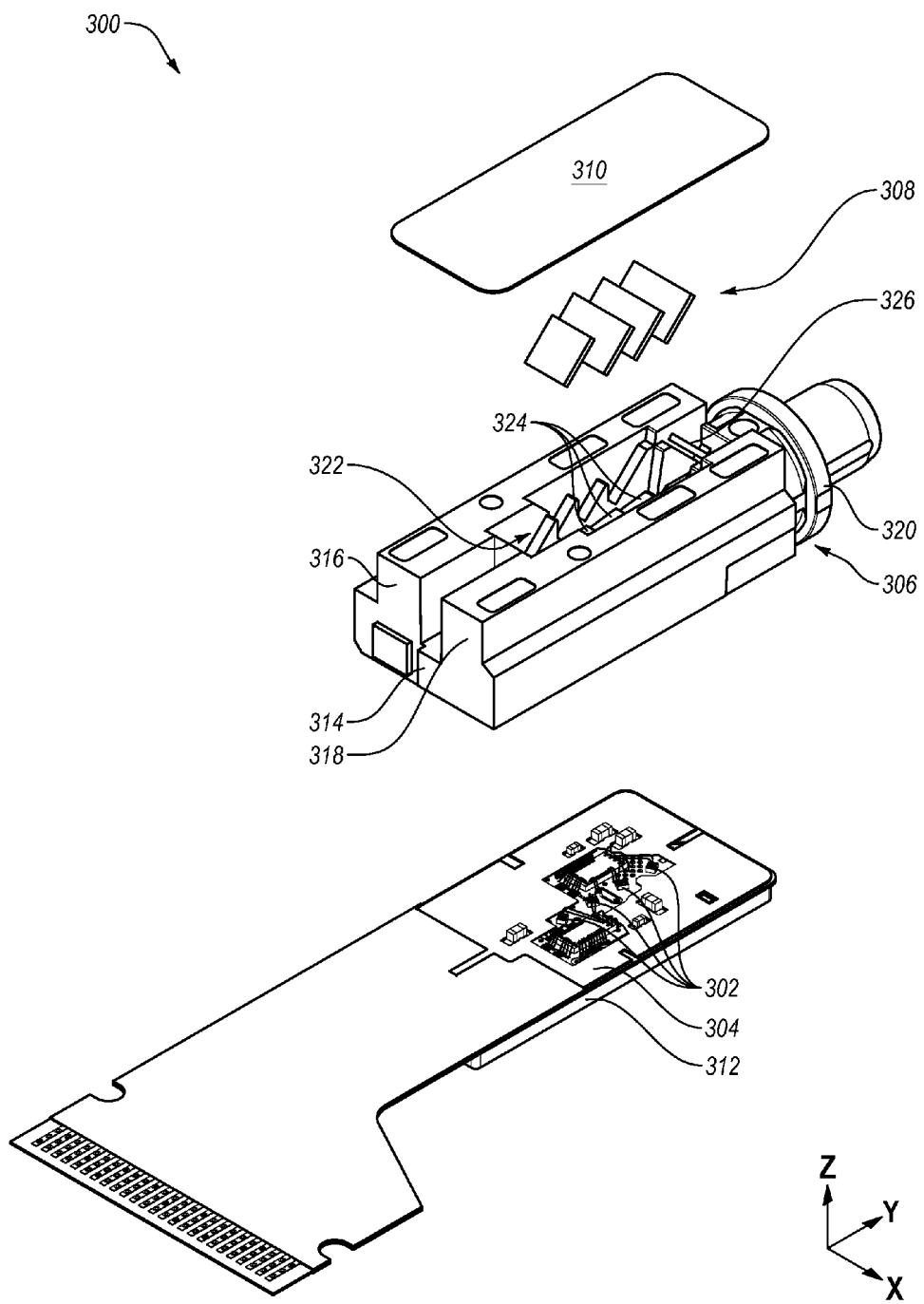

FIGS. 3A and 3B include a perspective view and a partially exploded perspective view of an example N-channel WDM optical subassembly (OSA) 300 (hereinafter "OSA 300"), arranged in accordance with at least one embodiment described herein. The OSA 300 may include a multi-channel OSA such that N is at least two. In some embodiments, the OSA 300 may include a SWDM OSA. The OSA 300 may include or correspond to the ROSA 610 of FIG. 2 or to one or more of the DEMUX 109, the N optical receivers 108, and the N post amplifiers 110 of FIG. 1. Alternatively or additionally, the OSA 300 may include or correspond to the TOSA 612 of FIG. 2 or to one or more of the N drivers 104, the N optical transmitters 106, and the MUX 107 of FIG. 1.

FIGS. 3A and 3B and many other figures herein include an arbitrarily defined x-y-z coordinate system as an aid to understand the relative orientations of the various figures. In the x-y-z coordinate system, a y axis or y direction is parallel to a length of the OSA 300 and a light propagation direction into or out of the OSA. An x axis or x direction is transverse and orthogonal to the y axis and generally defines a lateral direction. A z axis or z direction is orthogonal to both of the x and y axes and generally defines a vertical direction. The use of relative directional terms is to be understood in the context of the x-y-z coordinate system. For example, forward, front, frontward, and similar terms may refer to the positive y direction, while rearward, back, backward, and similar terms may refer to the negative y direction unless context dictates otherwise. As another example, upward, upper, top, and similar terms may refer to the positive z direction while downward, lower, bottom, and similar terms may refer to the negative z direction unless context dictates otherwise.

In general, the OSA 300 includes multiple active optical devices 302 (FIG. 3B) coupled to a carrier 304, an optical block 306, and a MUX or DEMUX 308 (hereinafter "WDM device 308") (FIG. 3B). In some embodiments, the active optical devices 302 include N photodiodes or other optical receivers, in which case the WDM device 308 may include the DEMUX and the OSA 300 may include a ROSA. In other embodiments, the active optical devices include N VCSELs or other optical transmitters, in which case the WDM device 308 may include the MUX and the OSA 300 may include a TOSA. The OSA 300 may additionally include a top cover 310.

The carrier 304 may include a flexible circuit board, a printed circuit board (PCB), a ceramic, or other suitable carrier to which the active optical devices 302 may be coupled. The carrier 304 may include traces or other elements to carry electrical signals to and/or from the OSA 300.

In some embodiments, a heat spreader 312 is coupled to a bottom of the carrier 304 to transfer heat generated by the active optical devices 302 away from the active optical devices 302. The heat spreader 312 may include a thermally conductive metal such as copper and/or other thermally conductive material.

The optical block 306 may generally be positioned above the active optical devices 302 and the carrier 304 and may be coupled to the carrier 304. The optical block 306 illustrated in FIGS. 3A and 3B includes a bottom 314, a first side 316, a second side 318, and a port 320. The bottom 314 may include multiple lenses formed in the bottom 314, as illustrated in subsequent figures. The lenses may be aligned with and positioned above the active optical devices 302. The first side 316 may extend up from the bottom 314. The second side 318 is opposite the first side 316 and may also extend up from the bottom 314. The port 320 may extend forward from the bottom 314 and the first and second sides 316 and 318. The bottom 314, the first and second sides 316 and 318, and the port 320 may define an optical block cavity 322 that extends rearward from the port 320.

The WDM device 308 may be positioned in the optical block cavity 322 in an optical path between the port 320 and the active optical devices 302. The WDM device 308 may include multiple thin film filters and a mirror, as described in more detail below. The thin film filters and the mirror of the WDM device 308 may be generically referred to as elements of the WDM device 308. Each of the elements of the WDM device 308 may be aligned at about a 45 degree angle to incoming light. For example, each of the elements of the WDM device 308 may be aligned at about a 45 degree angle to incoming light from the port 320 (and to outgoing light to the active optical devices 302) when the OSA 300 is implemented as a ROSA. Alternatively, each of the elements of the WDM device 308 may be aligned at about a 45 degree angle to incoming light from the active optical devices 302 (and to outgoing light to the port 320) when the OSA 300 is implemented as a TOSA. The term "about" as applied to a particular value or values for angular alignment herein may refer to a range that includes the value plus or minus 2 degrees. In comparison, some WDM devices include thin film filters aligned at much smaller angles to incoming light, such as an 8 or 12 degree angle to incoming light.

By aligning the elements of the WDM device 308 at about 45 degrees to incoming light, a total length in the y direction of the OSA 300 may be much shorter than would otherwise be possible with elements of the WDM device 308 aligned at relatively smaller angles. In these and other embodiments, a total a length of the OSA 300 in the y direction may be less than about 20 millimeters. For example, the total length of the OSA 300 in the y direction may be about 18.15 millimeters. More generally, the dimensions of the OSA 300 may be small enough to fit inside a QSFP-compliant optoelectronic device, such as the device 200 of FIG. 2, along with any other necessary components of the QSFP-compliant optoelectronic device. In comparison, OSAs with thin film filters aligned at relatively small angles may be too long to fit within QSFP-compliant optoelectronic devices along with any other necessary components of the QSFP-compliant optoelectronic device.

In addition, elements of the WDM device 308 may be individually and actively aligned to the optical block 306, as described in more detail below. This may permit the optical block 306 and/or other components of the OSA 300 to have looser tolerances than would otherwise be possible with more conventional components and/or assembly methods, which may ultimately lead to higher yield in mass-produced OSAs 300.

In some embodiments, each of the thin film filters of the WDM device 308 may include a short wave pass filter configured to pass light with wavelengths less than a cutoff wavelength and to reflect light with wavelengths greater than the cutoff wavelength. Where the OSA 300 includes N active optical devices 302, the WDM device 308 may include N−1 thin film filters. In the example of FIGS. 3A and 3B, the thin film filters of the WDM device include the front three elements of the WDM device 308, and the mirror includes the rearmost element of the WDM device 308. The cutoff wavelengths of the thin film filters of the WDM device 308 may decrease from front to back. In such an arrangement, the active optical devices 302 may be configured to emit or receive optical signals on optical channels that decrease from front to back. For example, beginning from front to back, a front or first of the active optical devices 302 (hereinafter the "first active optical device 302") may emit or receive an optical signal at about 940 nanometers (nm), a next or second of the active optical devices 302 (hereinafter the "second active optical device 302") may emit or receive an optical signal at about 910 nm, a next or third of the active optical devices 302 (hereinafter the "third active optical device 302") may emit or receive an optical signal at about 880 nm, and a last or fourth of the active optical devices 302 (hereinafter the "fourth active optical device 302") may emit or receive an optical signal at about 850 nm.

In other embodiments, each of the thin film filters of the WDM device 308 may include a long wave pass filter configured to pass light with wavelengths greater than a cutoff wavelength and to reflect light with wavelengths less than the cutoff wavelength. In these and other embodiments, the cutoff wavelengths of the thin film filters may increase from front to back and the active optical devices 302 may be configured to emit or receive optical signals on optical channels that increase from front to back.

In some embodiments when the OSA 300 is implemented as a ROSA as illustrated in FIG. 3B, the OSA 300 may additionally include multiple cross-talk isolation filters 324 (FIG. 3B). Where the OSA 300 includes N active optical devices 302, the OSA 300 may include N−1 cross-talk isolation filters 324. Each of the cross-talk isolation filters 324 may be configured to isolate each of the front N−1 active optical devices 302 from optical signals with wavelengths that should have been passed rearward by the corresponding thin film filter of the WDM device 308 but at least a portion of which was reflected downward. For example, each of the cross-talk isolation filters may have a cutoff wavelength that allows light with a desired wavelength to pass and light with wavelengths above or below the cutoff wavelength to be reflected. Each of the cross-talk isolation filters 324 may be positioned between a different one of the thin film filters of the WDM device 308 and a corresponding one of the active optical devices 302. In some embodiments in which the thin film filters of the WDM device 308 includes short wave pass filters, the cross-talk isolation filters 324 may include long wave pass filters. In some embodiments in which the thin film filters of the WDM device 308 includes long wave pass filters, the cross-talk isolation filters 324 may include short wave pass filters. The cutoff frequency of each of the cross-talk isolation filters 324 may be the same as the cutoff frequency of the corresponding one of the thin film filters of the WDM device 308 above it. Alternatively or additionally, the cross-talk isolation filters 324 may include band pass filters with an appropriate pass band to pass a desired channel and reject other channels.

In some embodiments, the OSA 300 may additionally include a front mirror 326 (FIG. 3B) generally disposed at the front of the OSA 300. The front mirror 326 may be aligned between the port 320 and WDM device 308 to form with the WDM device 308 and the lenses formed in the bottom 314 of the optical block 306 an optical path that directs light between the active optical devices 302 and the port 320.

Each of the elements of the WDM device 308, the front mirror 326, and the cross-talk isolation filters 324 may include multiple thin layers of dielectric material having different refractive indices, or other suitable configuration.

Figure 4:
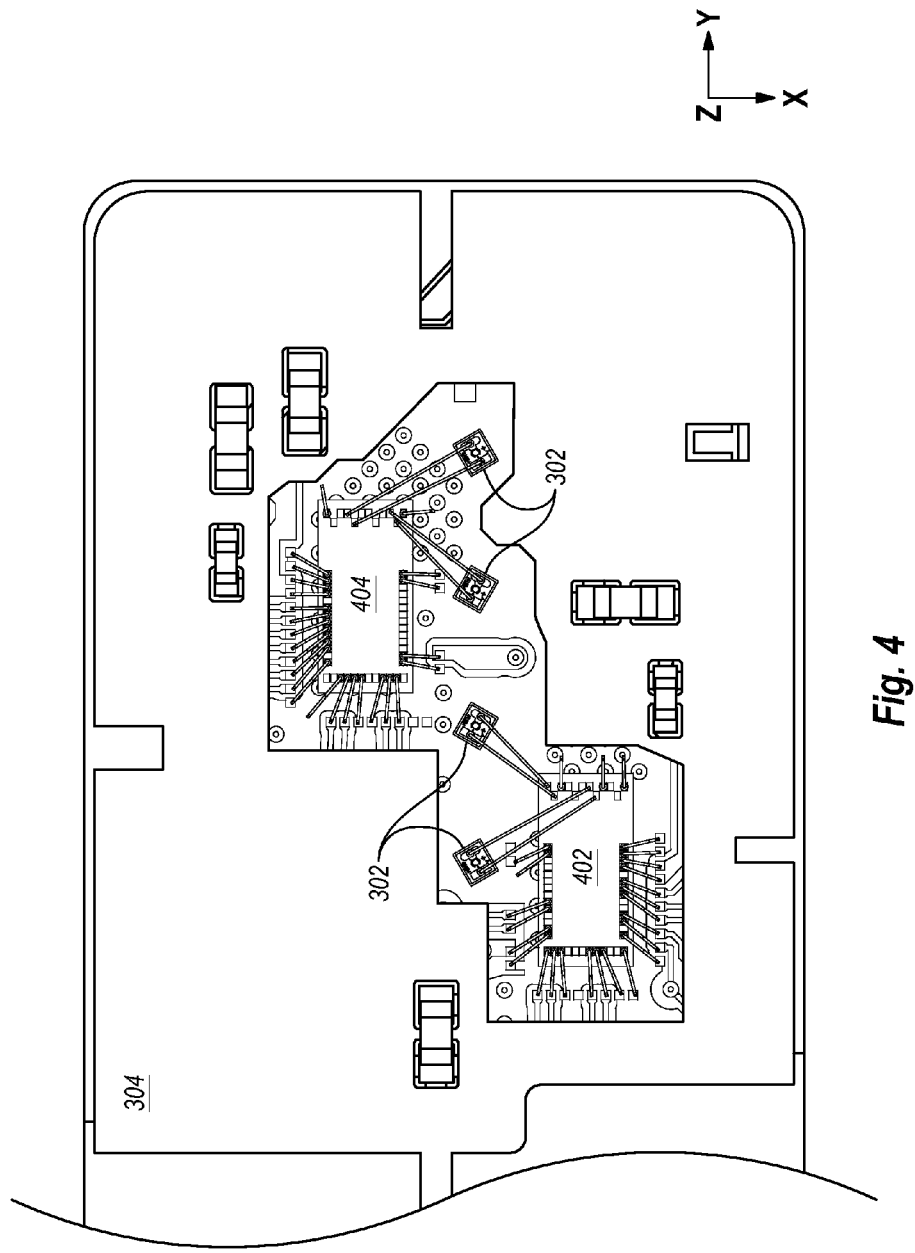
FIG. 4 is an overhead view of a carrier and active optical devices that may be included in the N-channel WDM OSA of FIGS. 3A and 3B.

FIG. 4 is an overhead view of the carrier 304 and the active optical devices 302, arranged in accordance with at least one embodiment described herein. As illustrated, the active optical devices 302 are generally arranged in a line in the y direction and include four active optical devices 302. The active optical devices 302 may have other arrangements and/or quantities in other embodiments.

FIG. 4 additionally illustrates integrated circuits (ICs) 402 and 404 that may be coupled to the carrier 304. For example, the ICs 402 and 404 include a first IC 402 and a second IC 404. The first IC 402 is communicatively coupled to the two rearmost active optical devices 302. The second IC 404 is communicatively coupled to the two frontmost active optical devices 302. In the example of FIG. 4, each of the first and second ICs 402 and 404 may include a 2-channel post-amplifier where the active optical devices 302 include optical receivers, or a 2-channel driver where the active optical devices 302 include optical transmitters. More generally, the carrier 304 may include one or more ICs coupled thereto, where each of the one or more ICs provides single-channel or multi-channel post amplifier or driver functions.

Figure 5:
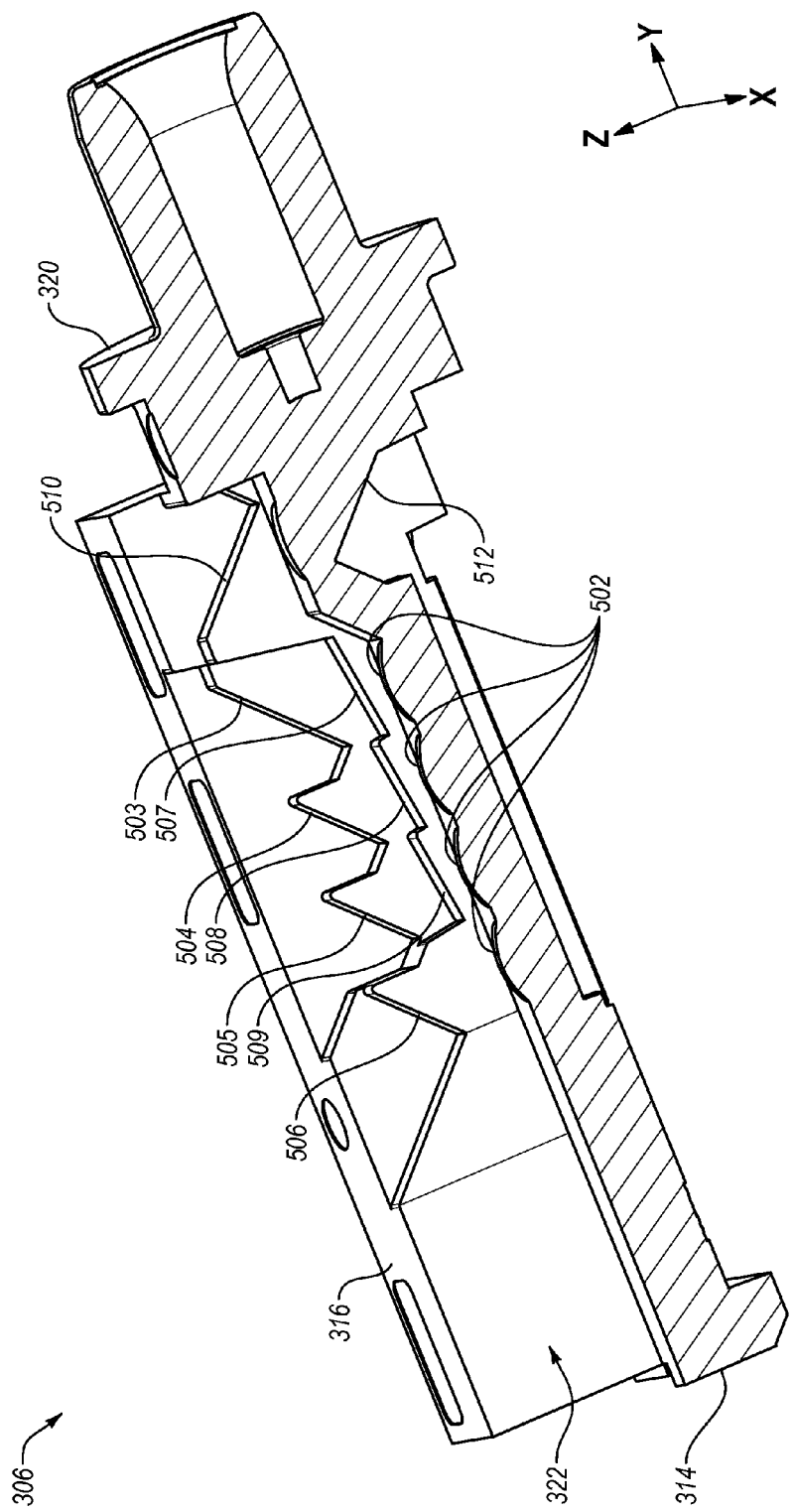
FIG. 5 is a cross-sectional perspective view of an optical block that may be included in the N-channel WDM OSA of FIGS. 3A and 3B.

FIG. 5 is a cross-sectional perspective view of the optical block 306, arranged in accordance with at least one embodiment described herein. As illustrated in FIG. 5, the bottom 314 of the optical block 306 includes multiple lenses 502 formed therein that are generally arranged in a line in the y direction. In other embodiments, the lenses 502 may have other arrangements. A pitch, e.g., a center-to-center spacing, of the lenses 502 may be equal or approximately equal to a pitch of the active optical devices 302 of FIGS. 3A-4. The lenses 502 may be positioned above the active optical devices 302 and aligned to the active optical devices 302 such that each of the lenses 502 has the same or approximately the same x and y coordinates as the active optical device 302 beneath. Where the active optical devices 302 include optical receivers, the lenses 502 may be configured to focus incoming optical signals from the port 320 onto the active optical devices 302. Where the active optical devices 302 include optical transmitters, the lenses 502 may be configured to collimate incoming optical signals from the active optical devices 302.

The optical block 306 additionally includes sets of ledges formed in the first and second sides 316 and 318. Only one ledge of each set of ledges is visible in FIG. 5 since only the first side 316 is visible in FIG. 5. The ledges of the second side 318 may generally mirror the ledges of the first side 316.

In more detail, the first side 316 includes first ledges 503-506 that are mirrored by first ledges in the second side 318 that are not visible in FIG. 5. The first side 316 may additionally include second ledges 507-509 and a front ledge 510 that are mirrored by second ledges and a front ledge in the second side 318 that are not visible in FIG. 5. Each set of ledges as discussed herein may include a ledge from the first side 316 and a corresponding ledge from the second side 318 that mirrors the ledge from the first side 316.

The first ledges 503-506 in the first side 316 and the first ledges in the second side 318 may be configured to support each of the elements of the WDM device 308 above a corresponding one of the active optical devices 302 and a corresponding one of the lenses 502 at about a 45 degree angle to incoming light. Starting from the front, a first set of ledges that includes the first ledge 503 in the first side 316 and a corresponding first ledge in the second side 316 may support a front or first one of the elements of the WDM device 308 (hereinafter the "first element of the WDM device 308"), a second set of ledges that includes the first ledge 504 in the first side 316 and a corresponding first ledge in the second side 316 may support a next or second one of the elements of the WDM device 308 (hereinafter the "second element of the WDM device 308"), a third set of ledges that includes the first ledge 505 in the first side 316 and a corresponding first ledge in the second side 316 may support a next or third one of the elements of the WDM device 308 (hereinafter the "third element of the WDM device 308"), and a fourth set of ledges that includes the first ledge 506 in the first side 316 and a corresponding first ledge in the second side 316 may support a last or fourth one of the elements of the WDM device 308 (hereinafter the "fourth element of the WDM device 308"). Although four first ledges 503-506 are illustrated in FIG. 5, more generally the optical block 306 may include N first ledges to support N elements of the WDM device 308.

The second ledges 507-509 in the first side 316 and the second ledges in the second side 318 may be configured to support each of the cross-talk isolation filters 324 of FIG. 3B in ROSA implementations of the OSA 300. In TOSA implementations of the OSA 300, the second ledges 507-509 in the first side 316 and the second ledges in the second side 318 may be unused or may even be omitted altogether. In some embodiments, the optical block 306 is formed identically and/or from a common mold for both ROSA and TOSA implementations to simplify tooling and fabrication, in which case the optical block 306 includes the second ledges 507-509 in the first side 316 and the second ledges in the second side 318 for both ROSA and TOSA implementations.

The cross-talk isolation filters 324 may be supported above the N−1 front active optical devices 302 and the N−1 front lenses 502 and below the N−1 front elements of the WDM device 308. Starting from the front, a fifth set of ledges that includes the second ledge 507 in the first side 316 and a corresponding second ledge in the second side 316 may support a front or first one of the cross-talk isolation filters 324 (hereinafter the "first cross-talk isolation filter 324"), a sixth set of ledges that includes the second ledge 508 in the second side 316 and a corresponding second ledge in the second side 316 may support a next or second one of the cross-talk isolation filters 324 (hereinafter the "second cross-talk isolation filter 324"), and a seventh set of ledges that includes the second ledge 509 in the first side 316 and a corresponding second ledge in the second side 316 may support a last or third one of the cross-talk isolation filters 324 (hereinafter the "third cross-talk isolation filter 324"). Although three second ledges 507-509 are illustrated in FIG. 5, more generally the optical block 306 may include N−1 second ledges to support N−1 cross-talk isolation filters 324. In other embodiments, the optical block 306 may include N second ledges to support N cross-talk isolation filters 324 where there is a different one of the cross-talk isolation filters 324 above each of the N lenses 502.

The front ledge 510 in the first side 316 and the front ledge in the second side 318 may be configured to support the front mirror 326 to direct light between the port 320 and the WDM device 308 of FIG. 3B at about a 45 degree angle to incoming light. The front mirror 326 may be supported within the optical block cavity 322 in the optical path between a reflector facet 512 of the optical block 306 and the front element of the WDM device 308. The reflector facet 512 may be aligned at about a 45 degree angle to incoming light and may be positioned in the optical path between the port 320 and the front mirror 326.

The optical block 306 may be fabricated as a single unitary component. For example, the optical block 306 may be injection molded or otherwise fabricated as a unitary component using Ultem or other suitable material. In other embodiments, the optical block 306 may be fabricated as multiple discrete components coupled together. Fabrication tolerances for Ultem and other suitable materials may, in some embodiments, be too stringent to allow for passive placement of the front mirror 326 and the elements of the WDM device 308 on the corresponding ledges 503-510 of the first and second sides 316 and 318 of the optical block 306. Accordingly, fabrication of the OSA 300 of FIGS. 3A and 3B may involve active alignment of the front mirror 326 and the elements of the WDM device 308, as described in more detail below.

FIGS. 6A and 6B include cross-sectional side views of a ROSA 600A and a TOSA 600B, arranged in accordance with at least one embodiment described herein. The ROSA 600A of FIG. 6A is a ROSA implementation of the OSA 300 described herein. The TOSA 600B of FIG. 6B is a TOSA implementation of the OSA 300 described herein. Some of the components on the carrier 304 have been omitted from FIGS. 6A and 6B for clarity. The ROSA 600A of FIG. 6A includes the cross-talk isolation filters 324 and the active optical devices 302 of the ROSA 600A may include optical receivers. In comparison, the TOSA 600B of FIG. 6B omits the cross-talk isolation filters 324 and the active optical devices 302 of the TOSA 600B may include optical transmitters. In many other respects, the ROSA 600A and the TOSA 600B may be similar or identical. For example, each of the ROSA 600A and the TOSA 600B includes the carrier 304, the optical block 306, and the WDM device 308, all configured and arranged as described herein.

As illustrated in FIGS. 6A and 6B, the first element of the WDM device 308 is positioned above a front or first one of the lenses 502 (hereinafter the "first lens 502"), which is positioned above the first active optical device 302. Similarly, moving backward, the second element of the WDM device 308 is positioned above a next or second one of the lenses 502 (hereinafter the "second lens 502"), which is positioned above the second active optical device 302. Similarly, moving backward, the third element of the WDM device 308 is positioned above a next or third one of the lenses 502 (hereinafter the "third lens 502"), which is positioned above the third active optical device 302. Similarly, moving backward, the fourth element of the WDM device 308 is positioned above a next or fourth one of the lenses 502 (hereinafter the "fourth lens 502"), which is positioned above the fourth active optical device 302.

In addition, in the ROSA 600A of FIG. 6A, the first cross-talk isolation filter 324 is positioned between the first element of the WDM device 308 and the first lens 502, the second cross-talk isolation filter 324 is positioned between the second element of the WDM device 308 and the second lens 502, and the third cross-talk isolation filter 324 is positioned between the third element of the WDM device 308 and the third lens 502.

Figure 7A:
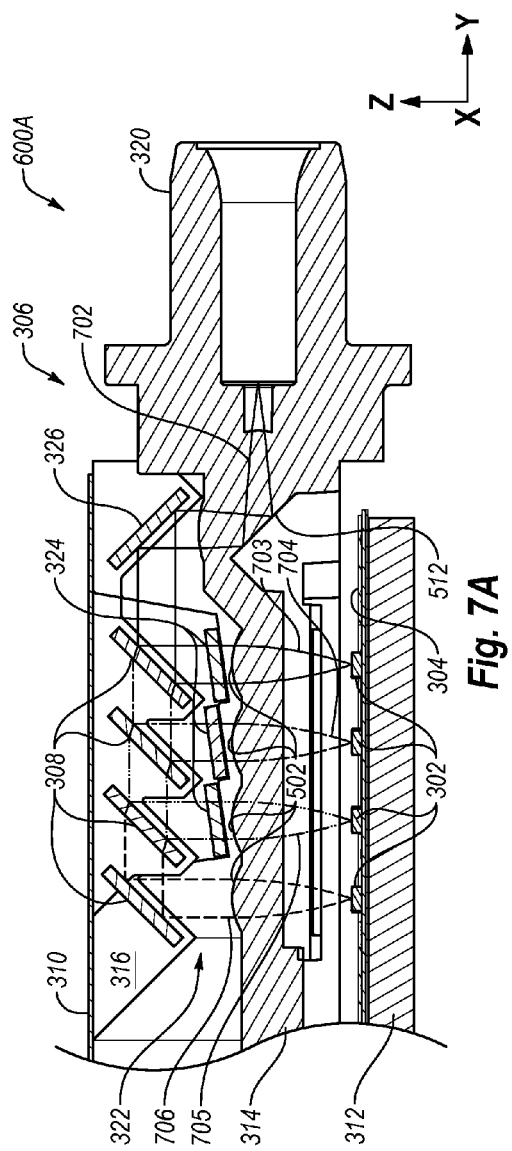
FIGS. 7A and 7B illustrate an optical path through each of the ROSA and the TOSA of FIGS. 6A and 6B.
Figure 7B:
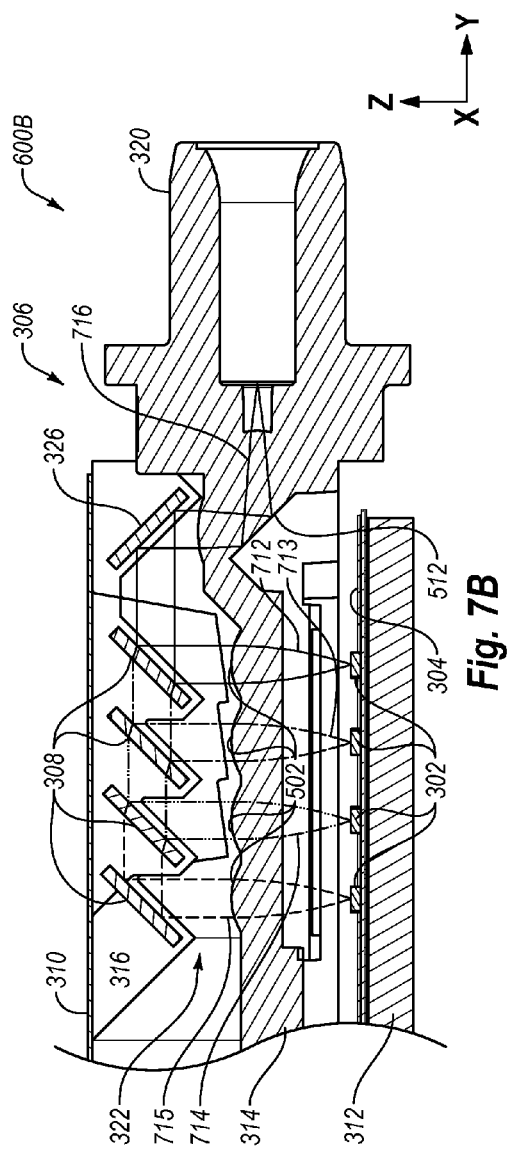

FIGS. 7A and 7B illustrate an optical path through each of the ROSA 600A and the TOSA 600B of FIGS. 6A and 6B between the port 320 and the active optical devices 302. In FIG. 7A, the "optical path" generally includes a path any or all of N optical signals travel through the ROSA 600A from the port 320 to any of the active optical devices 302. In FIG. 7B, the "optical path" generally includes a path any or all of N optical signals 716 travel through the TOSA 600B from any of the active optical devices 302 to the port 320.

Referring to the ROSA 600A illustrated in FIG. 7A, N optical signals 702 are received through the port 320 and are incident on the reflector facet 512. The reflector facet 512 redirects the N optical signals 702 upward toward the front mirror 326. The N optical signals 702 are incident on the front mirror 326, which redirects the N optical signals 702 backward to the WDM device 308. Cutoff wavelengths of the front N−1 elements of the WDM device 308 are selected so that at each of the front N−1 elements of the WDM device 308, one of the N optical signals 702 is redirected downward while any remaining ones of the N optical signals 702 pass through to the next element in the WDM device 308.

For example, suppose the N optical signals 702 include first, second, third, and fourth optical signals 703-706 on four distinct channels and that the channels are respectively at about 940 nm, 910 nm, 880 nm, and 850 nm. In this example, the front N−1 elements of the WDM device 308 may include short wave pass filters with respective cutoff wavelengths from front to back of about 925 nm, 895 nm, and 865 nm. Further, the N−1 cross-talk isolation filters 324 may include long wave pass filters with respective cutoff wavelengths from front to back of about 925 nm, 895 nm, and 865 nm.

Accordingly, at the first element (short wave pass filter with cutoff frequency of about 925 nm) of the WDM device 308, the first signal 703 on the 940 nm channel may be redirected downward while the second, third, and fourth signals 704-706 may pass through to the second element of the WMD device 308. The first signal 703 may pass through the first cross-talk isolation filter 324 (long wave pass filter with cutoff frequency of about 925 nm), while any portions of the second, third, or fourth signals 704-706 that may have been reflected at the first element of the WDM device 308 may be rejected (e.g., reflected) by the first cross-talk isolation filter 324. The first signal 703 may also pass through the first lens 502, which focuses the first signal 703 onto the first active optical device 302.

Moving backward, at the second element (short wave pass filter with cutoff frequency of about 895 nm) of the WDM device 308, the second signal 704 on the 910 nm channel may be redirected downward while the third and fourth signals 705 and 706 may pass through to the third element of the WMD device 308. The second signal 704 may pass through the second cross-talk isolation filter 324 (long wave pass filter with cutoff frequency of about 895 nm), while any portions of the third or fourth signals 705 and 706 that may have been reflected at the second element of the WDM device 308 may be rejected (e.g., reflected) by the second cross-talk isolation filter 324. The second signal 704 may also pass through the second lens 502, which focuses the second signal 704 onto the second active optical device 302.

Moving backward, at the third element (short wave pass filter with cutoff frequency of about 865 nm) of the WDM device 308, the third signal 705 on the 880 nm channel may be redirected downward while the fourth signal 706 may pass through to the fourth element of the WMD device 308. The third signal 705 may pass through the third cross-talk isolation filter 324 (long wave pass filter with cutoff frequency of about 865 nm), while any portion of the fourth signal 706 that may have been reflected at the third element of the WDM device 308 may be rejected (e.g., reflected) by the third cross-talk isolation filter 324. The third signal 705 may also pass through the third lens 502, which focuses the third signal 705 onto the third active optical device 302.

Moving backward, at the fourth element, e.g., the mirror, of the WDM device 308, the fourth signal 706 on the 850 nm channel may be redirected downward. The third signal 704 may pass through the fourth lens 502, which focuses the fourth signal 706 onto the fourth active optical device 302.

The specific channels of the N optical signals 702 and the specific cutoff wavelengths of the elements of the WDM device 308 and of the cross-talk isolation filters 502 discussed above may be selected according to a desired application and, as such, may be different than described above.

Referring to the TOSA 600B illustrated in FIG. 7B, the N active optical devices 302 may emit multiple optical signals 712-715. The optical signals 712-715 individually pass through a corresponding one of the N lenses 502 to the WDM device 308, which multiplexes the optical signals 712-715 into N optical signals 716 that share a common optical path. The N optical signals 716 are incident on the front mirror 326, which redirects the N optical signals 716 downward toward the reflector facet 512. The N optical signals 716 are incident on the reflector facet 512, which redirects the N optical signals 716 frontward to exit the port 320.

In more detail according to an example embodiment, suppose the optical signals 712-715 include first, second, third, and fourth optical signals 712-715 on four distinct channels and that the channels are respectively at about 940 nm, 910 nm, 880 nm, and 850 nm emitted in that order by the active optical devices 302 from front to back. In this example, the front N−1 elements of the WDM device 308 may include short wave pass filters with respective cutoff wavelengths from front to back of about 925 nm, 895 nm, and 865 nm.

Accordingly, the first active optical device 302 emits the first optical signal 712 on the 940 nm channel, which is collimated by the first lens 502 and received at the first element (shortwave pass filter with cutoff frequency of about 925 nm) of the WDM device 308. Because the first optical signal 712 is on the 940 nm channel that is greater than the cutoff frequency of the first element of the WDM device 308, the first optical signal 712 is redirected frontward toward the front mirror 326 by the first element of the WDM device 308.

Moving backward, the second active optical device 302 emits the second optical signal 713 on the 910 nm channel, which is collimated by the second lens 502 and received at the second element (shortwave pass filter with cutoff frequency of about 895 nm) of the WDM device 308. Because the second optical signal 713 is on the 910 nm channel that is greater than the cutoff frequency of the second element of the WDM device 308, the second optical signal 713 is redirected frontward by the second element of the WDM device 308. Because the second optical signal 713 is on the 910 nm channel that is less than the cutoff frequency of the first element of the WDM device 308, the second optical signal 713 passes through the first element of the WDM device 308 to the front mirror 326.

Moving backward, the third active optical device 302 emits the third optical signal 714 on the 880 nm channel, which is collimated by the third lens 502 and received at the third element (shortwave pass filter with cutoff frequency of about 865 nm) of the WDM device 308. Because the third optical signal 714 is on the 880 nm channel that is greater than the cutoff frequency of the third element of the WDM device 308, the third optical signal 714 is redirected frontward by the third element of the WDM device 308. Because the third optical signal 714 is on the 880 nm channel that is less than the cutoff frequency of each of the first and second elements of the WDM device 308, the third optical signal 714 passes through each of the first and second elements of the WDM device 308 to the front mirror 326.

Moving backward, the fourth active optical device 302 emits the fourth optical signal 715 on the 850 nm channel, which is collimated by the fourth lens 502 and received at the fourth element, e.g., the mirror, of the WDM device 308. The fourth element of the WDM device 308 redirects the fourth optical signal 715 frontward. Because the fourth optical signal 715 is on the 850 nm channel that is less than the cutoff frequency of each of the first, second, and third elements of the WDM device 308, the fourth optical signal 715 passes through each of the first, second, and third elements of the WDM device 308 to the front mirror 326. In the foregoing manner, the first, second, third, and fourth optical signals 712-715 may be multiplexed by the WDM device 308 into the N optical signals 716 that share the common optical path to be redirected by the front mirror 326 and the reflector facet 512 as already described to exit the TOSA 600B through the port 320.

The specific channels of the N optical signals 716 and the specific cutoff wavelengths of the elements of the WDM device 308 discussed above may be selected according to a desired application and, as such, may be different than described above.

III. WDM OSA Fabrication

Embodiments described herein may additionally include techniques associated with fabricating a WDM OSA, such as the OSA 300, the ROSA 600A, and/or the TOSA 600B, generically referred to hereinafter as the "OSA 300/600" or "OSAs 300/600." For example, fabrication of the OSA 300/600 may include one or more of the following alignment phases. An overview of the alignment phases will first be provided, followed by a more detailed description of each of the alignment phases, all of which will be discussed in the context of the OSAs 300/600.

In a first alignment phase, the front mirror 326 may be aligned to the optical block 306. Aligning the front mirror 326 to the optical block 306 may include actively aligning the front mirror 326 to the optical block 306 to ensure a beam is within a threshold range of angles of an intended optical axis. The threshold range of angles may include ±1 degree in some embodiments.

In a second alignment phase, the optical block 306 may be aligned to the carrier 304. Aligning the optical block 306 to the carrier 304 may include actively aligning the optical block 306 to the carrier 304.

In a third alignment phase, the elements of the WDM device 308 may be individually aligned to the optical block 306. Individually aligning the elements of the WDM device 308 to the optical block may include actively aligning each of the elements of the WDM device 308 to the optical block 306.

A. First Alignment Phase

Figures 8A, 8B:
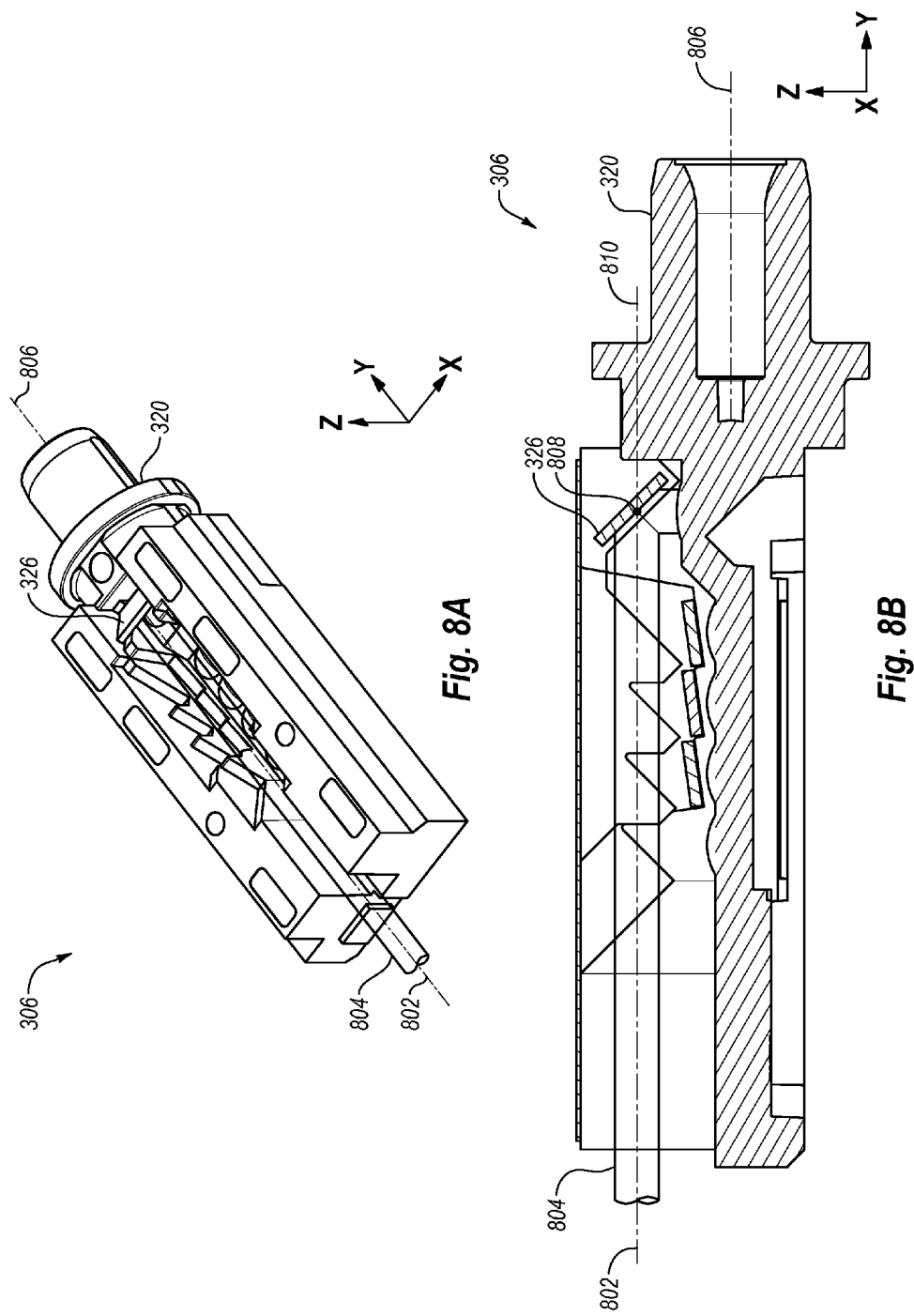
FIGS. 8A and 8B respectively include a perspective view and a side view of the optical block and a front mirror that may be included in the N-channel WDM OSA of FIGS. 3A and 3B.

FIGS. 8A and 8B respectively include a perspective view and a side view of the optical block 306 and the front mirror 326, arranged in accordance with at least one embodiment described herein. FIGS. 8A and 8B are referenced in the discussion of the first alignment phase. In more detail, the front mirror 326 may be aligned to the optical block 306 in the first alignment phase. The optical block 306 may be positioned within an alignment system in which an intended optical axis 802 of the optical block 306 is known and deviations of a fiber coupled optical signal 804 from the intended optical axis 802 may be determined. Insofar as the fiber coupled optical signal 804 may be a collimated optical signal as it travels through the optical block 306, it may also be referred to as a collimated optical signal 804.

The alignment system may include a fiber coupled light source, e.g., an optical transmitter coupled to an optical fiber, and one or more optical detectors or a camera screen. A fiber ferrule of the optical fiber may be inserted in the optical block 306 to emit the fiber coupled optical signal 804 into the port 320 along an optical axis 806 of the port 320. One or more apertures, the one or more optical detectors and/or the camera screen may be positioned behind the optical block 306 at and/or around the intended optical axis 802.

With the fiber coupled optical signal 804 entering the port 320 along the optical axis 806 of the port 320 being collimated by the input optical surfaces, and beginning with the front mirror 326 positioned on or near the front ledge 510 of the first side 316 and the front ledge of the second side 318, the position of the front mirror 326 in the x, y, and/or z directions may be adjusted, tip of the front mirror 326 may be adjusted, and/or tilt of the front mirror 326 may be adjusted. One or more of the foregoing adjustments may be made until one or more feedback signals generated by the one or more optical detectors or the camera screen in response to all or a portion of the collimated optical signal 804 being incident thereon indicate that the collimated optical signal 804 is within a threshold range of angles (e.g., ±1 degree) of the intended optical axis 802.

As used herein, tip may refer to rotation of a component about a tip axis that passes through the component, e.g., through its center, and that is parallel to the x axis. Additionally, tilt may refer to rotation of a component about a tilt axis that passes through the component, e.g., through its center, and that is parallel to the y axis. Thus, in the example of FIGS. 8A and 8B, tip may refer to rotation of the front mirror 326 about a tip axis 808 (FIG. 8B) of the front mirror 326 that passes through the front mirror 326 and that is parallel to the x axis and tilt may refer to rotation of the front mirror 326 about a tilt axis 810 (FIG. 8B) of the front mirror 326 that passes through the front mirror 326 and that is parallel to the y axis.

The alignment system used in the first alignment phase may additionally include an epoxy dispenser. Prior to aligning the front mirror 326 to the optical block 306, the epoxy dispenser may dispense epoxy on the front ledge 510 (FIG. 5) of the first side 316 (FIGS. 3A, 3B, and 5) and on the front ledge of the second side 318 (FIGS. 3A and 3B) of the optical block 306. The epoxy may be used to secure the front mirror 326 to the optical block 306 with the front mirror 326 aligned to the optical block 306. In an example embodiment, the epoxy may tack cure in response to exposure to ultraviolet (UV) light and may more thoroughly cure in response to exposure to heat. Thus, the epoxy may be exposed to UV light when the front mirror 326 is aligned to the optical block 306 to tack the front mirror 326 to the optical block 306 and may subsequently be thermally cured.

B. Second Alignment Phase

Figure 10:
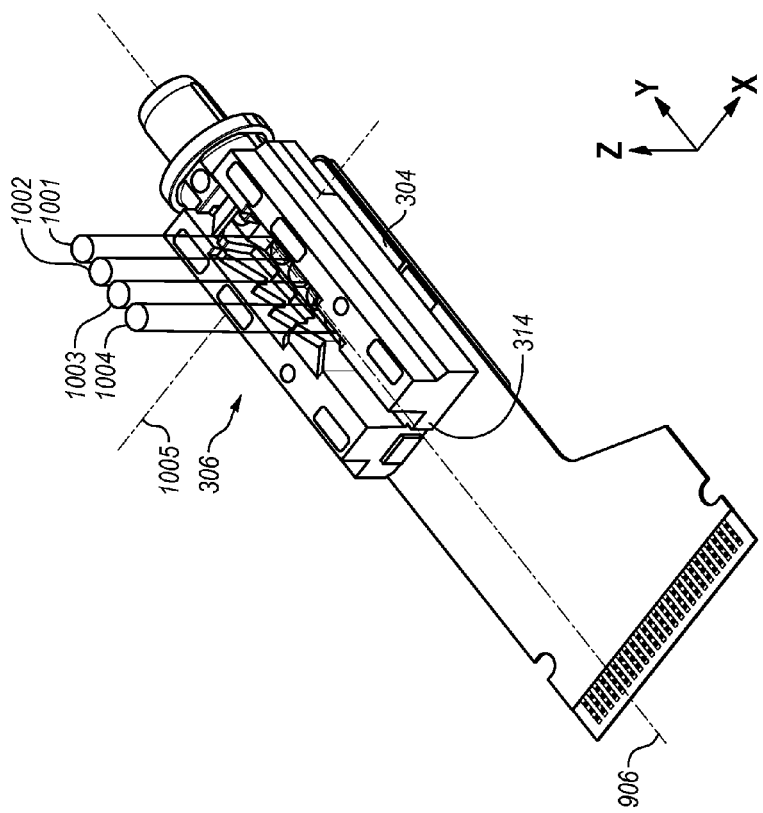
FIG. 10 includes another perspective view of the optical block and the carrier that may be included in the N-channel WDM OSA of FIGS. 3A and 3B.
Figure 9:
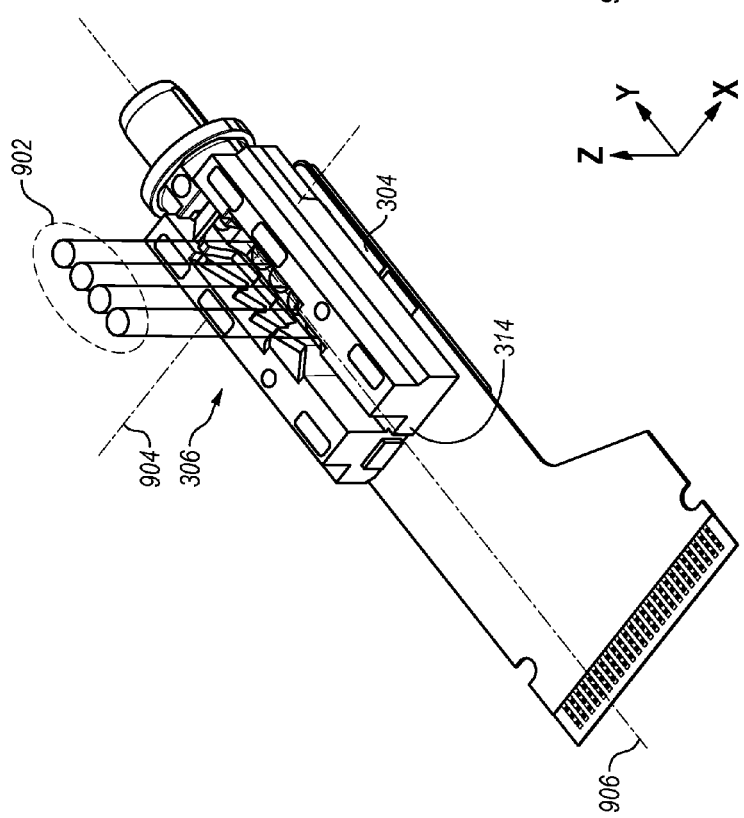
FIG. 9 includes a perspective view of the optical block and the carrier that may be included in the N-channel WDM OSA of FIGS. 3A and 3B.

FIGS. 9 and 10 each include a perspective view of the optical block 306 and the carrier 304, arranged in accordance with at least one embodiment described herein. FIGS. 9 and 10 are referenced in the following discussion of the second alignment phase. In more detail, the optical block 306 may be aligned to the carrier 304 in the second alignment phase such that each of the lenses 502 (FIGS. 5-7B) formed in the bottom 314 of the optical block 306 is aligned to a corresponding one of the active optical devices 302 (FIGS. 3B, 4, and 6A-7B). The optical block 306 may then be secured to the carrier 304 with the optical block 306 aligned to the carrier 304, as described in more detail below.

Alignment of the optical block 306 to the carrier 304 may generally include powering the carrier 304, including powering the active optical devices 302, and actively aligning the optical block 306 to the carrier 304. The active alignment in the case of a ROSA implementation may generally include illuminating the optical block 306 from above using a high power, highly collimated optical source, e.g., at 940 nm, to flood the optical block 306 from above. The active alignment in the case of a TOSA implementation may generally include capturing a camera image from above of output of the active optical devices 302.

With reference to FIG. 9, in a ROSA implementation in which the active optical devices 302 include optical receivers, the carrier 304 with the active optical devices 302 and the optical block 306 may be positioned beneath a collimated light source. The collimated light source may be turned on to illuminate the optical block 306 from above with a collimated optical signal 902. The collimated optical signal 902 is illustrated in FIG. 9 as having four discrete components that correspond to portions of the collimated optical signal 902 that may pass through the lenses 502 formed in the bottom 314 of the optical block 306 to the active optical devices 302 below. At this stage of fabrication, the cross-talk isolation filters 324 (FIGS. 3B, 6A, and 7A) may already be installed in the optical block 306, but the WDM device 308 is not yet installed.

The optical block 306 may be positioned relative to the carrier 304 and the active optical devices 302 at an appropriate z start position in the z direction. The z start position may be a constant start position determined during aligner equipment bring up.

With the carrier 304 powered, the active optical devices 302 may each generate a feedback signal indicative of an amount of the collimated optical signal 902 that both passes through a corresponding one of the lenses 502 and is incident on a corresponding one of the active optical devices 302. For example, the first active optical device 302 may generate a first feedback signal indicative of an amount of the collimated optical signal 902 that both passes through the first lens 502 and is incident on the first active optical device 302. Similarly, the second, third, and fourth active optical devices 302 may respectively generate second, third, and fourth feedback signals indicative of an amount of the collimated optical signal 902 that both passes through the respective second, third, and fourth lens 502 and is incident on the second, third, or fourth active optical device 302.

The optical block 306 may then be translated relative to the carrier 304 and the active optical devices 302 in the x, y, and z directions to a first intermediate position at which the first feedback signal generated by the first active optical device 302 satisfies a first predetermined criterion. The first predetermined criterion may include maximization via a centroid method. Thus, translating the optical block 306 relative to the carrier 304 and the active optical devices 302 in the x, y, and z directions to the first intermediate position at which the first feedback signal satisfies the first predetermined criterion may include translating the optical block 306 relative to the carrier 304 and the active optical devices 302 in the x, y, and z directions to a position (e.g., the first intermediate position) at which the first feedback signal is maximized via the centroid method. In these and other embodiments, the centroid method may include an automated scan in any of the aforementioned directions such that the signal includes the peak value and rolloff to greater than 90% of peak in both directions, the center align value is then computed as the midpoint between the two edge 90% of peak values, or alternatively computed as the first order numerical centroid of the scan (centroid=sum (position$_i$*scanvalue$_i$)/sum(scanvalue$_i$)].

From the first intermediate position, tip and tilt of the optical block 306 may be adjusted until the optical block 306 is in a second intermediate position at which the fourth feedback signal generated by the fourth active optical device 302 satisfies the first predetermined criterion, e.g., maximization of the fourth feedback signal via the centroid method. In more detail, tip of the optical block 306 may be adjusted by rotation of the optical block 306 about a tip axis 904 of the optical block 306 that passes through the first lens 502 and that is parallel to the x axis and tilt of the optical block 306 may be adjusted by rotation of the optical block 306 about a tilt axis 906 of the optical block 306 that passes through the first lens 502 and that is parallel to the y axis.

The positioning of the optical block 306 relative to the carrier 304 and the active optical devices 302 may then be optimized from the second intermediate position. For example, the optical block 306 may be translated in the x, y, and z directions from the second intermediate position within a relatively small displacement range (e.g., less than about 9 microns) to determine best centroid locations for each of the four active optical devices (e.g., locations of the optical block 306 relative to the carrier 304 at which the first predetermined criterion is satisfied for each of the first, second, third, and fourth feedback signals. Alternatively or additionally, the optical block 306 may be rotated about the tip and tilt axes 904 and 906 within a relatively small rotation range (e.g., less than about 9 microns) to balance a best for each of the first, second, third, and fourth feedback signals individually against an aggregate best for the first, second, third, and fourth feedback signals. After the optimization, the optical block 306 may be at a final position relative to the carrier 304 and the active optical devices 302 at which the first, second, third, and fourth feedback signals satisfy a second predetermined criterion. The second predetermined criterion may include the aggregate best for the first, second, third, and fourth feedback signals being balanced against the best for each of the first, second, third, and fourth feedback signals individually.

With reference to FIG. 10, in a TOSA implementation in which the active optical devices 302 include optical transmitters, power may be provided to each of the active optical devices 302 to cause the active optical devices 302 to emit first, second, third, and fourth optical signals 1001-1004. The carrier 304 with the active optical devices 302 and the optical block 306 may be positioned beneath a camera screen or other optical sensor or sensors. The optical block 306 may be translated relative to the carrier 304 and the active optical devices 302 in the x and y directions to a start position at which the camera screen detects the first, second, third, and fourth optical signals 1001-1004 in response to the first, second, third, and fourth lenses 502 (FIGS. 5-7B) of the optical block 306 being respectively roughly aligned in the x and y directions to the first, second, third, and fourth active optical devices 302. At the start position, the first, second, third, and fourth optical signals 1001-1004 may generally be centered on the camera screen in the x and y directions.

From the start position with the lenses 502 roughly aligned to the active optical devices 302 in the x and y directions, the optical block 306 may be translated relative to the carrier 304 and the active optical devices 302 in the z direction to a first intermediate location at which spot images of the first, second, third, and fourth optical signals 1001-1004 one the camera screen are much smaller than the camera screen. The first intermediate location may be a constant or semi-constant position determined during aligner equipment bring up which may be adjusted on a per lot basis due to incoming material variation. At this time or another time, camera exposure of the camera screen may be adjusted to an appropriate level for good image definition of the optical signals 1001-1004 without saturation.

From the first intermediate position, the optical block 306 may be translated relative to the carrier 304 and the active optical devices 302 in the z direction to a second intermediate position at which the camera screen detects that the first optical signal emitted by the first active optical device 302 satisfies a first transmitter predetermined criterion. The first transmitter predetermined criterion may include minimization of a spot image of a corresponding optical signal on the camera screen, such as minimization of a first spot image of the first optical signal 1001 on the camera screen in this particular example.

From the second intermediate position, tip of the optical block 306 may be adjusted until the optical block 306 is in a third intermediate position at which the fourth optical signal 1004 or the third optical signal 1003 satisfies the first transmitter predetermined criterion, e.g., minimization of a fourth spot image of the fourth optical signal 1004 or of a third spot image of the third optical signal 1003 on the camera screen. In more detail, tip of the optical block 306 may be adjusted by rotation of the optical block 306 about a tip axis 1005 of the optical block 306 that passes through the first lens 502 and that is parallel to the x axis.

The positioning of the optical block 306 relative to the carrier 304 and the active optical devices 302 may then be optimized from the third intermediate position. For example, the optical block 306 may be translated in the x and y directions from the third intermediate position within a relatively small displacement range (e.g., less than about 9 microns) to a fourth intermediate position to minimize a root mean square (RMS) distance of the first, a second, the third, and the fourth spot images of the first, second, third, and fourth optical signals 1001-1004 on the camera screen relative to four predetermined reference locations. The four predetermined reference locations may be located on the camera screen; may be spaced at a nominal pitch of the active optical devices 302; and may be parallel to a line that generally passes through the first, second, third, and fourth lenses 502 from the port translated to the camera screen.

From the fourth intermediate position, the optical block 306 may be translated relative to the carrier 304 and the active optical devices 302 in the z direction to a fifth intermediate position at which the camera screen detects that the first, second, third, and fourth spot images of the first, second, third, and fourth optical signals 1001-1004 on the camera screen satisfy a second transmitter predetermined criterion. The second transmitter predetermined criterion may include the first, second, third, and fourth spot images being in focus on the camera screen at about the same z location, e.g., within 20 micrometers, for the optical block 306.

If the second transmitter predetermined criterion is not satisfied, the translation in the z direction to the second intermediate position, tip adjustment to the third intermediate position, and/or position optimization to the fourth intermediate position may be repeated, followed by translation in the z direction to the fifth intermediate position until the second transmitter predetermined criterion is satisfied.

If the second transmitter predetermined criterion is satisfied, the optical block 306 may be translated relative to the carrier 304 and the active optical devices 302 in the z direction by a z direction offset distance. The z direction offset distance may account for difference between best focus for the camera screen versus actual best focus into an optical fiber received in the port 320.

An alignment system used in the second alignment phase, whether for a ROSA or TOSA implementation, may include components associated with carrying out the steps described with respect to the second alignment phase, such as the collimated light source, the camera screen, one or more electronic circuits to provide power to the carrier 304 and the active optical devices 302, and a jig to adjust the position, tip, and/or tilt of the optical block 306 relative to the carrier 304 and the active optical devices 302. The alignment system used in the second alignment phase may additionally include an epoxy dispenser. Prior to aligning the optical block 306 relative to the carrier 304 and the active optical devices 302, the epoxy dispenser may dispense epoxy on the carrier 304 in a bond area of the carrier 304 that is expected to be coupled to a bond area of the optical block 306. The bond area of the optical block 306 may come in contact with the epoxy in response to aligning the optical block 306 to the carrier 304. In an example embodiment, the epoxy may tack cure in response to exposure to ultraviolet (UV) light and may more thoroughly cure in response to exposure to heat. Thus, the epoxy may be exposed to UV light when the optical block 306 is aligned to the carrier 304 to tack the optical block 306 to the carrier 304 and may subsequently be thermally cured.

The alignment system used in the second alignment phase may include the alignment system used in the first alignment phase. Alternatively, the alignment system used in the second alignment phase may be different than the alignment system used in the first alignment phase.

C. Third Alignment Phase

Figure 11:
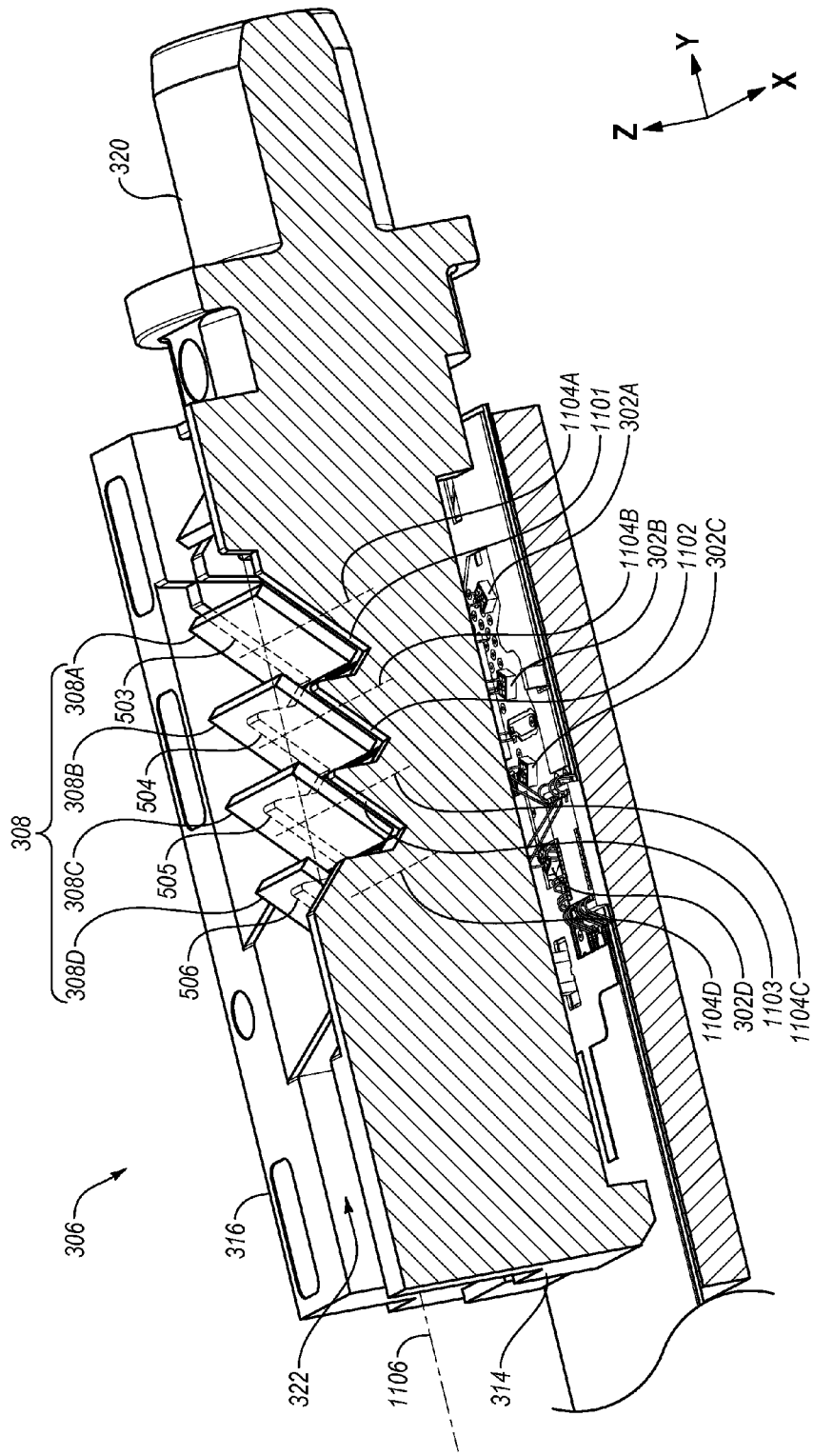
FIG. 11 is a cross-sectional perspective view of the N-channel WDM OSA of FIGS. 3A and 3B, all arranged in accordance with at least some embodiments described herein.

FIG. 11 is a cross-sectional perspective view of the OSAs 300/600 described herein, arranged in accordance with at least one embodiment described herein. FIG. 11 is referenced in the discussion of the third alignment phase. In more detail, the elements of the WDM device 308 may be individually aligned to the optical block 306 in the third alignment phase to form with the lenses 502 (FIGS. 5-7B) the optical path that directs light between the active optical devices 302 and the port 320. The elements of the WDM device 308 may be aligned to the optical block 306 within the optical block cavity 322. The third alignment phase with individual alignment of each element of the WDM device 308 may compensate for any x-y die offset or tip or tilt of the active optical devices 302.

FIG. 11 illustrates the ledges 503-506 formed in the first side 316 of the optical block 306 and additionally illustrates three of four corresponding ledges 1101-1103 formed in the second side 318 of the optical block 306. A first set of ledges that includes the ledge 503 and the ledge 1101 support the first element of the WDM device 308. A second set of ledges that includes the ledge 504 and the ledge 1102 support the second element of the WDM device 308. A third set of ledges that includes the ledge 505 and the ledge 1103 support the third element of the WDM device 308. A fourth set of ledges that includes the ledge 506 and a ledge (not shown) formed in the second side 318 of the optical block 306 opposite the ledge 506 support the fourth element of the WDM device 308.

In the discussion that follows, an individual element of the WDM device 308 may be referred to as the ith element for i=1 to i=4, or more generally for i=1 to i=N. The elements of the WDM device 308 may be individually aligned proceeding in sequence from i=1 to i=4, e.g., from front to back. Reference may also be made to the ith active optical device 302, the ith lens 502, and the ith set of ledges which are associated with the ith element of the WDM device 308. For instance, the first element of the WDM device 308 is associated with the first active optical device 302, the first lens 502, and the first set of ledges 503 and 1101.

An alignment system for the third alignment phase may include components associated with carrying out the steps described with respect to the third alignment phase. The components of the alignment system may include one or more of a light source to input light through the port 320, an optical detector to receive light output from the port 320, and a jig to adjust a position, tip, and/or tilt of the elements of the WDM device 308 individually relative to the optical block 306. The alignment system used in the third alignment phase may include the alignment system used in one or both of the first and second alignment phases. Alternatively, the alignment system used in the third alignment phase may be different than the alignment system used in the first and second alignment phases.

In a ROSA implementation in which the active optical devices 302 include optical receivers, the light source may be positioned to provide incoming light through the port 320. Feedback for each of the active optical devices 302 may include a photocurrent generated by the active optical device 302 or a received signal strength indicator (RSSI) voltage corresponding to the photocurrent. Whether photocurrent or RSSI voltage, the feedback is associated with and used to align the ith element of the WDM device 308, and may therefore be referred to as the ith element alignment feedback signal.

The light source may provide incoming light on all wavelength channels through the port 320 at the same time, or each wavelength channel may be provided by the light source one at a time depending on which element of the WDM device 308 is being aligned. The ith element alignment feedback signal may be indicative of an amount of the incoming light that reaches the ith one of the active optical devices 302. In the absence of the ith element of the WDM device 308, the ith active optical device 302 may not receive any of the incoming light, as may be indicated by the ith element alignment feedback signal.

In some embodiments, the individual alignment of each of the elements of the WDM device 308 to the optical block 306 may generally include moving the element to a default start position, scanning in tip and tilt and position via the centroid method, scanning in z relying on mechanical registration for x placement and aligning to best position via the centroid method. More particularly, the ith element of the WDM device 308 may be positioned in the optical block cavity 322 above an ith active optical device 302 and an ith lens 502 above (e.g., about 200 microns above in some embodiments) an ith set of ledges formed in the first and second sides 316, 318 of the optical block 306 or at another default start position. For example, the first (or second, third, or fourth) element of the WDM device 308 may be positioned in the optical block cavity 322 above the first (or second, third or fourth) active optical device 302 and above the first set of ledges 503 and 1101 (or on the second, third, or fourth set of ledges). The set of ledges may generally align the ith element of the WDM device 308 at about a 45 degree angle to incoming light from the port and at about a 45 degree angle to outgoing light to the ith active optical device 302.

From the default start position, tip and tilt and z position of the ith element of the WDM device 308 may be adjusted until the ith element of the WDM device 308 is in an intermediate position at which the ith element alignment feedback signal satisfies the first predetermined criterion, e.g., maximization of the ith element feedback signal via the centroid method. In more detail, tip of the ith element of the WDM device 308 may be adjusted by rotation of the ith element of the WDM device about a tip axis 1104A, 1104B, 1104C, or 1104D (generically "tip axis 1104") of the ith element of the WDM device 308 that passes through the ith element of the WDM device 308 and that is parallel to the x axis. Tilt of the ith element of the WDM device 308 may be adjusted by rotation of the ith element of the WDM device 308 about a tilt axis 1106 of the ith element of the WDM device 308 that passes through the ith element of the WDM device 308 and that is parallel to the y axis. Z position of the ith element of the WDM device 308 may be adjusted by translating the ith element of the WDM device 308 relative to the optical block 306 in the z direction.

From the intermediate position, tip, tilt, and z position of the ith element of the WDM device 308 may be sequentially aligned via the centroid method multiple times in order to optimize and determine the best final position of the WDM device 308 relative to the optical block 306.

In a TOSA implementation in which the active optical devices 302 include optical transmitters, the optical detector of the alignment system used for the third alignment phase may be positioned to receive light emitted by the active optical devices 302 that may be output through the port 320. The ith active optical device 302 may emit an ith optical signal. As each of the ith active optical devices 302 emits, in turn, its optical signal, the optical detector may generate a photocurrent and/or a RSSI voltage corresponding to the photocurrent, either of which may be indicative of an amount of the ith optical signal that reaches the optical detector. Thus, providing power to the ith active optical device 302 during the third alignment phase to emit the ith optical signal may cause the optical detector to generate a feedback signal, a strength of which may vary depending on the presence and exact alignment of the ith element of the WDM device 3008 relative to the optical block 306. As such, the feedback signal generated by the optical detector may be referred to as the ith element alignment feedback signal. In the absence of the ith element of the WDM device 308, the optical detector may not receive any of the ith optical signal generated by the ith active optical device 302, as may be indicated by the ith element alignment feedback signal.

In some embodiments, individually aligning each of the elements of the WDM device 308 to the optical block 306 may generally include moving the ith element of the WDM device 308 to a default start position, scanning in tip and tilt and position via the centroid method, scanning in z relying on mechanical registration for x placement and aligning to best position via the centroid method. More particularly, the ith element of the WDM device 308 may be positioned in the optical block cavity 322 above an ith active optical device 302 and an ith lens 502 above (e.g., about 200 microns above in some embodiments) an ith set of ledges formed in the first and second sides 316, 318 of the optical block 306 or at another default start position. For example, the first (or second, third, or fourth) element of the WDM device 308 may be positioned in the optical block cavity 322 above the first (or second, third or fourth) active optical device 302 and above the first set of ledges 503 and 1101 (or on the second, third, or fourth set of ledges). The ith set of ledges may generally align the ith element of the WDM device 308 at about a 45 degree angle to incoming light from the ith active optical device 302 and at about a 45 degree angle to outgoing light to the port 320.

From the default start position, tip and tilt and z position of the ith element of the WDM device 308 may be adjusted until the ith element of the WDM device 308 is in an intermediate position at which the ith element alignment feedback signal is output through the port 320 and satisfies the first predetermined criterion, e.g., maximization of the ith element feedback signal via the centroid method. In more detail, tip of the ith element of the WDM device 308 may be adjusted by rotation of the ith element of the WDM device about the ith tip axis 1104 of the ith element of the WDM device 308. Tilt of the ith element of the WDM device 308 may be adjusted by rotation of the ith element of the WDM device 308 about the tilt axis 1106. Z position of the ith element of the WDM device 308 may be adjusted by translating the ith element of the WDM device 308 relative to the optical block 306 in the z direction.

From the intermediate position, z position of the ith element of the WDM device 308 may be adjusted sequentially aligned via the centroid method multiple times in order to optimize and determine the best final position of the WDM device 308 relative to the optical block 306.

The alignment system used in the third alignment phase in both the ROSA and the TOSA implementations may additionally include an epoxy dispenser. Prior to aligning the ith element of the WDM device 308 to the optical block 306, the epoxy dispenser may dispense epoxy on the ith set of ledges of the optical block 306 that will eventually support the ith element of the WDM device 308. A set of edges of the ith element of the WDM device 308 may come in contact with the epoxy on the ith set of ledges of the optical block 306 in response to individually aligning each of the elements of the WDM device 308 to the optical block 306. In an example embodiment, the epoxy may tack cure in response to exposure to ultraviolet (UV) light and may more thoroughly cure in response to exposure to heat. Thus, the epoxy may be exposed to UV light when each element of the WDM device 308 is individually aligned to the optical block 306 to tack each element of the WDM device 308 to the optical block 306 and may subsequently be thermally cured.

The foregoing describes a method to fabricate the OSAs 300/600, where the method includes three alignment phases, each with one or more steps, acts, functions, and/or operations. One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An N-channel wavelength division multiplexing or demultiplexing (WDM) optical subassembly (OSA), comprising:
    a plurality of active optical devices coupled to a carrier;
    an optical block positioned above the plurality of active optical devices and coupled to the carrier, wherein the optical block includes:
        a bottom with a plurality of lenses formed in the bottom that are aligned with the plurality of active optical devices;
        a first side that extends up from the bottom;
        a second side that extends up from the bottom and is opposite the first side;
        a port that extends forward from the bottom and the first and second sides; and
        an optical block cavity defined by the bottom and the first and second sides that extends rearward from the port; and
    a wavelength division multiplexer (MUX) or a wavelength division demultiplexer (DEMUX) positioned in the optical block cavity in an optical path between the port of the optical block and the plurality of active optical devices, the MUX or the DEMUX comprising:
        a first thin film filter positioned above a first of the plurality of active optical devices and a first of the plurality of lenses;
        a second thin film filter positioned above a second of the plurality of active optical devices and a second of the plurality of lenses;
        a third thin film filter positioned above a third of the plurality of active optical devices and a third of the plurality of lenses; and
        a mirror positioned in the optical path between the port of the optical block and a fourth of the plurality of active optical devices above the fourth of the plurality of active optical devices and a fourth of the plurality of lenses.

2. The N-channel WDM OSA of claim 1, wherein the MUX or the DEMUX comprises a plurality of thin film filters positioned in the optical block cavity in the optical path, each aligned at about a 45 degree angle to incoming light.

3. The N-channel WDM OSA of claim 2, wherein:
    the plurality of active optical devices are arranged in a line;
    the plurality of lenses are arranged in a line above the plurality of active optical devices; and
    the mirror is aligned at about a 45 degree angle to incoming light.

4. The N-channel WDM OSA of claim 3, wherein:
    the optical block further comprises a reflector facet aligned at about a 45 degree angle to incoming light and positioned in the optical path between the port and the first thin film filter; and
    the N-channel WDM OSA further comprises a front mirror aligned at about a 45 degree angle to incoming light and positioned in the optical block cavity in the optical path between the reflector facet of the optical block and the first thin film filter.

5. The N-channel WDM OSA of claim 3, wherein:
    the first of the plurality of active optical devices comprises a first vertical cavity surface emitting laser (VCSEL) configured to emit light at about 940 nanometers (nm);
    the second of the plurality of active optical devices comprises a second VCSEL configured to emit light at about 910 nm;
    the third of the plurality of active optical devices comprises a third VCSEL configured to emit light at about 880 nm;
    the fourth of the plurality of active optical devices comprises a fourth VCSEL configured to emit light at about 850 nm;
    the first thin film filter comprises a first short wave pass filter configured to pass light with wavelengths less than about 925 nanometers (nm) and to reflect light with wavelengths greater than about 925 nm;
    the second thin film filter comprises a second short wave pass filter configured to pass light with wavelengths less than about 895 nm and to reflect light with wavelengths greater than about 895 nm;
    the third thin film filter comprises a third short wave pass filter configured to pass light with wavelengths less than about 865 nm and to reflect light with wavelengths greater than about 865 nm; and
    the MUX or the DEMUX comprises the MUX.

6. The N-channel WDM OSA of claim 3, wherein:
    the plurality of active optical devices comprise four photodiodes;
    the first thin film filter comprises a first short wave pass filter configured to pass light with wavelengths less than about 925 nanometers (nm) and to reflect light with wavelengths greater than about 925 nm;

the second thin film filter comprises a second short wave pass filter configured to pass light with wavelengths less than about 895 nm and to reflect light with wavelengths greater than about 895 nm;

the third thin film filter comprises a third short wave pass filter configured to pass light with wavelengths less than about 865 nm and to reflect light with wavelengths greater than about 865 nm;

the MUX or the DEMUX comprises the DEMUX;

the N-channel WDM OSA further comprises:
- a first long wave pass filter positioned between the first thin film filter and the first of the four active optical devices and configured to pass light with wavelengths greater than about 925 nm and reflect light with wavelengths less than 925 nm;
- a second long wave pass filter positioned between the second thin film filter and the second of the four active optical devices and configured to pass light with wavelengths greater than about 895 nm and reflect light with wavelengths less than 895 nm; and
- a third long wave pass filter positioned between the third thin film filter and the third of the four active optical devices and configured to pass light with wavelengths greater than about 865 nm and reflect light with wavelengths less than 865 nm.

7. An optoelectronic module, comprising:
a housing that defines a cavity; and
an N-channel wavelength division multiplexing or demultiplexing (WDM) optical subassembly (OSA) positioned within the cavity comprising:
- a plurality of active optical devices coupled to a carrier;
- an optical block coupled to the carrier, the optical block defining an optical block cavity;
- a wavelength division multiplexer (MUX) or a wavelength division demultiplexer (DEMUX) positioned in the optical block cavity and optically coupled with the plurality of active optical devices, the MUX or DEMUX comprising:
  - a first thin film filter positioned above a first of the plurality of active optical devices;
  - a second thin film filter positioned above a second of the plurality of active optical devices; and
  - a third thin film filter positioned above a third of the plurality of active optical devices; and
- a mirror positioned in the optical block cavity above a fourth of the plurality of active optical devices.

8. The optoelectronic module of claim 7, wherein the N-channel WDM OSA has a length less than about 20 millimeters (mm).

9. The optoelectronic module of claim 8, wherein the length of the N-channel WDM OSA is about 18.15 mm.

10. The optoelectronic module of claim 7,
wherein the optical block includes:
- a bottom with a plurality of lenses formed in the bottom that are aligned with the plurality of active optical devices;
- a first side that extends up from the bottom;
- a second side that extends up from the bottom and is opposite the first side;
- a port that extends forward from the bottom and the first and second sides; and
- the optical block cavity is defined by the bottom and the first and second sides that extends rearward from the port; and
wherein the MUX or the DEMUX is positioned in an optical path between the port of the optical block and the plurality of active optical devices.

11. The optoelectronic module of claim 10, wherein:
N comprises four;
the plurality of active optical devices are arranged in a line and include four active optical devices;
the plurality of lenses are arranged in a line above the plurality of active optical devices and include four lenses;
the first thin film filter, the second thing film filter, and the third thin film filter are each aligned at about a 45 degree angle to incoming light;
the first thin film filter is positioned above a first of the four lenses, the second thin film filter is positioned above a second of the four lenses, and the third thin film filter is positioned above a third of the four lenses;
the mirror is positioned in the optical path between the port of the optical block and the fourth of the plurality of active optical devices above a fourth of the four lenses; and
the mirror is aligned at about a 45 degree angle to incoming light.

12. The optoelectronic module of claim 11, wherein:
the first of the plurality of active optical devices comprises a first vertical cavity surface emitting laser (VCSEL) configured to emit light at about 940 nanometers (nm);
the second of the plurality of active optical devices comprises a second VCSEL configured to emit light at about 910 nm;
the third of the plurality of active optical devices comprises a third VCSEL configured to emit light at about 880 nm;
the fourth of the plurality of active optical devices comprises a fourth VCSEL configured to emit light at about 850 nm;
the first thin film filter comprises a first short wave pass filter configured to pass light with wavelengths less than about 925 nanometers (nm) and to reflect light with wavelengths greater than about 925 nm;
the second thin film filter comprises a second short wave pass filter configured to pass light with wavelengths less than about 895 nm and to reflect light with wavelengths greater than about 895 nm;
the third thin film filter comprises a third short wave pass filter configured to pass light with wavelengths less than about 865 nm and to reflect light with wavelengths greater than about 865 nm; and
the MUX or the DEMUX comprises the MUX.

13. The optoelectronic module of claim 11, wherein:
the four active optical devices comprise four photodiodes;
the first thin film filter comprises a first short wave pass filter configured to pass light with wavelengths less than about 925 nanometers (nm) and to reflect light with wavelengths greater than about 925 nm;
the second thin film filter comprises a second short wave pass filter configured to pass light with wavelengths less than about 895 nm and to reflect light with wavelengths greater than about 895 nm;
the third thin film filter comprises a third short wave pass filter configured to pass light with wavelengths less than about 865 nm and to reflect light with wavelengths greater than about 865 nm;
the N-channel WDM OSA further comprises:
- a first long wave pass filter positioned between the first thin film filter and the first of the four active optical devices and configured to pass light with wavelengths greater than about 925 nm and reflect light with wavelengths less than 925 nm;

a second long wave pass filter positioned between the second thin film filter and the second of the four active optical devices and configured to pass light with wavelengths greater than about 895 nm and reflect light with wavelengths less than 895 nm; and a third long wave pass filter positioned between the third thin film filter and the third of the four active optical devices and configured to pass light with wavelengths greater than about 865 nm and reflect light with wavelengths less than 865 nm; and the MUX or the DEMUX comprises the DEMUX.

14. A method to assemble an N-channel wavelength division multiplexing or demultiplexing (WDM) optical subassembly (OSA) that includes an optical block, a carrier, N−1 thin film filters, and a mirror, the method comprising:

aligning the optical block to the carrier such that each of N lenses formed in a bottom of the optical block is positioned above and is aligned to a corresponding one of N active optical devices coupled to the carrier;

securing the optical block to the carrier with the optical block aligned to the carrier;

individually aligning each of the N−1 thin film filters and the mirror to the optical block to form with the N lenses an optical path that directs light between the N active optical devices and a port of the optical block that extends forward from the bottom and first and second sides of the optical block, wherein the bottom and the first and second sides of the optical block define an optical block cavity that extends rearward from the port and the N−1 thin film filters and the mirror are aligned to the optical block within the optical block cavity; and securing each of the N−1 thin film filters and the mirror to the optical block with the N−1 thin film filters and the mirror aligned to the optical block;

wherein:
  a first thin film filter of the N−1 thin film filters is secured above a first of the N active optical devices;
  a second thin film filter of the N−1 thin film filters is secured above a second of the N active optical devices;
  a third thin film filter of the N−1 thin film filters is secured above a third of the N active optical devices; and
  the mirror is secured above a fourth of the N active optical devices.

15. The method of claim 14, further comprising aligning a front mirror to the optical block between the port and the N−1 thin film filters to form with the N−1 thin film filters, the mirror, and the N lenses the optical path that directs light between the N active optical devices and the port.

16. The method of claim 14, wherein:
the N active optical devices are arranged in a line and include four vertical cavity surface emitting lasers (VCSELs);
the N lenses are arranged in a line and include four lenses;
the method further includes positioning the carrier with the four VCSELs and the optical block beneath a camera screen; and
aligning the optical block to the carrier comprises:
  providing power to the four VCSELs to emit four optical signals;
  translating the optical block relative to the carrier and the VCSELs in a plane parallel to a plane of the carrier that is defined by orthogonal x and y directions to a start position at which the camera screen detects the four optical signals in response to the four lenses being roughly aligned to the four VCSELs in the x and y directions;
  with the four lenses roughly aligned to the four VCSELs in the x direction and the y direction, translating the optical block relative to the carrier and the VCSELs in a z direction that is orthogonal to each of the x and y directions to a first intermediate location at which the camera screen detects spot images of the four optical signals emitted by the four VCSELs;
  translating the optical block from the first intermediate position relative to the carrier and the VCSELs in the z direction to a second intermediate position at which the camera screen detects that a first of the four optical signals emitted by a first of the four VCSELs that is closest to the port satisfies a first predetermined criterion;
  rotating the optical block about an axis that is parallel to the plane defined by the x and y directions and that is orthogonal to a line that passes through the four lenses and that passes through a first one of the four lenses that is aligned to the first of the four VCSELs in the x and y directions to a third intermediate position at which the camera screen detects that a third of the four optical signals emitted by a third of the four VCSELs or a fourth of the four optical signals emitted by a fourth of the four VCSELs satisfies the first predetermined criterion;
  translating the optical block in the x and y directions relative to the carrier and the VCSELs from the third intermediate position within a displacement range less than about 9 microns to a fourth intermediate position;
  translating the optical block in the z direction relative to the carrier and the VCSELs to determine a fifth intermediate position at which the four spot images of the four optical signals satisfy a second predetermined criterion; and
  in response to the second predetermined criterion being satisfied, translating the optical block in the z direction relative to the carrier and the VCSELs by a z direction offset distance.

17. The method of claim 16, wherein individually aligning each of the N−1 thin film filters and the mirror to the optical block occurs after aligning and securing the optical block to the carrier and includes, for a corresponding element i of the N−1 thin film filters for i=1 to 3 and the mirror for i=4 and proceeding in sequence from i=1 to i=4:
  providing power to an ith one of the four VCSELs to generate an ith element alignment feedback signal;
  positioning an ith one of the elements in the optical block cavity above the ith one of the four VCSELs and above an ith one of four sets of ledges formed in the first and second sides of the optical block that align the ith one of the elements at about a 45 degree angle to incoming light from the ith one of the four VCSELs and about a 45 degree angle to outgoing light to the port;
  rotating the ith one of the elements about one or both of a tip axis that passes through the ith one of the elements and is parallel to the x direction or a tilt axis that passes through the ith one of the elements and is parallel to the y direction and translating the ith one of the elements relative to the optical block in the z direction to an intermediate position at which the ith element alignment feedback signal is output through the port and satisfies a second predetermined criterion;

from the intermedia position, sequentially performing one or more times the following steps to determine a best final position at which the ith element alignment feedback signal satisfies the predetermined criterion: rotating the ith one of the elements about the tip axis, rotating the ith one of the elements about the tilt axis, and translating the ith one of the elements in the z direction relative to the optical block.

18. The method of claim 17, wherein:
the method further comprises dispensing a first epoxy on the carrier in a bond area of the carrier that is coupled to a bond area of the optical block;
the bond area of the optical block comes in contact with the first epoxy in response to aligning the optical block to the carrier;
securing the optical block to the carrier with the optical block aligned to the carrier includes illuminating the first epoxy with ultraviolet (UV) light to tack the optical block to the carrier and subsequently thermally curing the first epoxy;
the method further comprises dispensing second epoxy on each of the four sets of ledges formed in the first and second sides of the optical block;
a set of edges of each of the N−1 thin film filters and the mirror comes in contact with the second epoxy on a corresponding one of the four sets of ledges in response to individually aligning each of the N−1 thin film filters and the mirror to the optical block;
securing each of the N−1 thin film filters and the mirror to the optical block with the N−1 thin film filters and the mirror aligned to the optical block includes individually illuminating the second epoxy on the corresponding one of the four sets of ledges with UV light to tack each of the N−1 thin film filters and the mirror to the optical block and subsequently thermally curing the second epoxy.

19. The method of claim 14, wherein:
the N active optical devices are arranged in a line and include four photodiodes;
the N lenses are arranged in a line and include four lenses;
the method further includes:
positioning the carrier with the four photodiodes and the optical block beneath a collimated light source and illuminating, by the collimated light source, the optical block from above with a collimated optical signal; and
aligning the optical block to the carrier comprises:
positioning the optical block relative to the carrier and the four photodiodes in a z start position in a z direction that is orthogonal to orthogonal x and y directions that define a plane of the carrier;
generating:
a first feedback signal indicative of an amount of the collimated optical signal that both passes through a first one of the four lenses that is closest to the port and is incident on a first one of the four photodiodes that is closest to the port;
a second feedback signal indicative of an amount of the collimated optical signal that both passes through a second one of the four lenses and is incident on a second one of the four photodiodes;
a third feedback signal indicative of an amount of the collimated optical signal that both passes through a third one of the four lenses that is farther from the port than the second one of the four lenses and is incident on a third one of the four photodiodes that is farther from the port than the second one of the four photodiodes;
a fourth feedback signal indicative of an amount of the collimated optical signal that both passes through a fourth one of the four lenses that is farthest from the port and is incident on a fourth one of the four photodiodes that is farthest from the port;
translating the optical block relative to the carrier and the four photodiodes in the x, y, and z directions to a first intermediate position at which the first feedback signal satisfies a first predetermined criterion;
from the first intermediate position, rotating the optical block about one or both of a tip axis that passes through the first one of the four lenses and is parallel to the x direction or about a tilt axis that passes through the first one of the four lenses and is parallel to the y direction to a second intermediate position at which the fourth feedback signal satisfies the first predetermined criterion;
translating the optical block in the x, y, and z directions relative to the carrier and the four photodiodes and rotating the optical block about one or both of the tip and tilt axes from the second intermediate position within a displacement range less than about 9 microns to a final position at which the first, second, third, and fourth feedback signals satisfy a second predetermined criterion.

20. The method of claim 19, wherein individually aligning each of the N−1 thin film filters and the mirror to the optical block occurs after aligning and securing the optical block to the carrier and includes, for a corresponding element i of the N−1 thin film filters for i=1 to 3 and the mirror for i=4 and proceeding in sequence from i=1 to i=4:
receiving incoming light at the port from external to the N-channel WDM OSA;
generating an ith element alignment feedback signal indicative of an amount of the incoming light that reaches an ith one of the four photodiodes from the port;
positioning an ith one of the elements in the optical block cavity above the ith one of the four photodiodes and above an ith one of four sets of ledges formed in the first and second sides of the optical block that align the ith one of the elements at about a 45 degree angle to incoming light from the port and at about a 45 degree angle to outgoing light to the ith one of the four photodiodes;
rotating the ith one of the elements about one or both of a tip axis that passes through a center of the ith one of the elements and is parallel to the x direction or a tilt axis that passes through the center of the ith one of the elements and is parallel to the y direction and translating the ith one of the elements relative to the optical block in the z direction to an intermediate position at which the ith element alignment feedback signal satisfies the predetermined criterion; and
from the intermediate position, sequentially performing one or more times the following steps to determine a final position at which the ith element alignment feedback signal satisfies the predetermined criterion: rotating the ith one of the elements about the tip axis, rotating the ith one of the elements about the tilt axis, and translating the ith one of the elements in the z direction relative to the optical block.

21. The method of claim 20, wherein:
- the method further comprises dispensing a first epoxy on the carrier in a bond area of the carrier that is expected to be coupled to a bond area of the optical block;
- the bond area of the optical block comes in contact with the first epoxy in response to aligning the optical block to the carrier;
- securing the optical block to the carrier with the optical block aligned to the carrier includes illuminating the first epoxy with ultraviolet (UV) light to tack the optical block to the carrier and subsequently thermally curing the first epoxy;
- the method further comprises dispensing second epoxy on each of the four sets of ledges formed in the first and second sides of the optical block;
- a set of edges of each of the N−1 thin film filters and the mirror comes in contact with the second epoxy on a corresponding one of the four sets of ledges in response to individually aligning each of the N−1 thin film filters and the mirror to the optical block;
- securing each of the N−1 thin film filters and the mirror to the optical block with the N−1 thin film filters and the mirror aligned to the optical block includes individually illuminating the second epoxy on the corresponding one of the four sets of ledges with UV light to tack each of the N−1 thin film filters and the mirror to the optical block and subsequently thermally curing the second epoxy.

* * * * *